United States Patent
Vajapeyam et al.

(10) Patent No.: US 11,172,370 B2
(45) Date of Patent: *Nov. 9, 2021

(54) DISCONTINUOUS RECEPTION PROCEDURES WITH ENHANCED COMPONENT CARRIERS

(71) Applicant: QUALCOMM Incorporated, San Diego, CA (US)

(72) Inventors: Madhavan Srinivasan Vajapeyam, San Diego, CA (US); Jelena Damnjanovic, Del Mar, CA (US); Aleksandar Damnjanovic, Del Mar, CA (US); Tao Luo, San Diego, CA (US); Jing Sun, San Diego, CA (US); Taesang Yoo, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/411,428

(22) Filed: May 14, 2019

(65) Prior Publication Data

US 2019/0268778 A1      Aug. 29, 2019

Related U.S. Application Data

(63) Continuation of application No. 15/042,491, filed on Feb. 12, 2016, now Pat. No. 10,334,447.
(Continued)

(51) Int. Cl.
*H04W 16/14* (2009.01)
*H04L 1/00* (2006.01)
(Continued)

(52) U.S. Cl.
CPC .......... *H04W 16/14* (2013.01); *H04L 1/0009* (2013.01); *H04L 1/0027* (2013.01);
(Continued)

(58) Field of Classification Search
CPC ... H04W 16/14; H04W 76/28; H04W 74/004; H04W 74/006; H04W 74/085;
(Continued)

(56) References Cited

U.S. PATENT DOCUMENTS 7,813,414 B2   10/2010   Lewis
9,839,049 B2   12/2017   Bashar et al.
(Continued)

FOREIGN PATENT DOCUMENTS

CN      101998525 A      3/2011
CN      102036347 A      4/2011
(Continued)

OTHER PUBLICATIONS

Taiwan Search Report—TW105104683—TIPO—dated Oct. 7, 2019.
(Continued)

*Primary Examiner* — Deepa Belur
(74) *Attorney, Agent, or Firm* — Holland & Hart LLP; Nerrie M. Zohn

(57) ABSTRACT

Methods, systems, and devices for wireless communication are described. Discontinuous reception (DRX) operation may be configured differently on enhanced component carriers (eCCs) than on other component carriers, including a primary cell (PCell). In some cases, a user equipment (UE) may be configured with several different eCC DRX modes. An eCC DRX configuration may, for example, be coordinated with downlink (DL) transmission time interval (TTI) scheduling so each DRX ON duration may correspond to a DL burst duration of the corresponding eCC. The eCC DRX ON durations may also be scheduled according to hybrid
(Continued)

automatic repeat request (HARQ) process scheduling. In some examples, eCC DRX ON durations may be based on listen-before-talk (LBT) procedures. In some cases, eCC DRX ON durations may be configured to contain an uplink (UL) burst to enable channel state information (CSI) reporting. The eCC DRX may also be configured to minimize interruption of the PCell.

24 Claims, 22 Drawing Sheets

Related U.S. Application Data

(60) Provisional application No. 62/121,754, filed on Feb. 27, 2015.

(51) Int. Cl.
*H04L 1/18* (2006.01)
*H04W 76/28* (2018.01)
*H04W 74/00* (2009.01)
*H04W 74/08* (2009.01)
*H04L 5/00* (2006.01)
*H04W 76/15* (2018.01)

(52) U.S. Cl.
CPC ......... *H04L 1/1854* (2013.01); *H04W 74/004* (2013.01); *H04W 74/006* (2013.01); *H04W 74/085* (2013.01); *H04W 76/28* (2018.02); *H04L 5/001* (2013.01); *H04L 5/0053* (2013.01); *H04W 76/15* (2018.02)

(58) Field of Classification Search
CPC ... H04L 1/0027; H04L 1/0009; H04L 1/1854; H04L 5/001
See application file for complete search history.

(56) References Cited

U.S. PATENT DOCUMENTS

| | | | |
|---|---|---|---|
| 10,588,140 B2 | 3/2020 | Uchino et al. | |
| 2010/0238880 A1 | 9/2010 | Wu | |
| 2011/0003555 A1* | 1/2011 | Guo | H04L 5/001 455/67.11 |
| 2011/0103315 A1 | 5/2011 | Camp, Jr. et al. | |
| 2011/0103333 A1* | 5/2011 | Berggren | H04L 5/001 370/329 |
| 2012/0087396 A1* | 4/2012 | Nimbalker | H04W 72/1252 375/219 |
| 2012/0176950 A1 | 7/2012 | Zhang et al. | |
| 2013/0077606 A1* | 3/2013 | Wu | H04W 72/1263 370/336 |
| 2013/0100931 A1* | 4/2013 | Kim | H04W 36/30 370/331 |
| 2013/0201834 A1 | 8/2013 | Klingenbrunn et al. | |
| 2013/0343288 A1 | 12/2013 | Ratasuk et al. | |
| 2014/0071954 A1* | 3/2014 | Au | H04W 72/042 370/336 |
| 2014/0086110 A1 | 3/2014 | Lee et al. | |
| 2015/0055589 A1 | 2/2015 | Yerramalli et al. | |
| 2015/0117287 A1* | 4/2015 | Kim | H04W 76/28 370/311 |
| 2015/0215097 A1 | 7/2015 | Yi et al. | |
| 2015/0296526 A1* | 10/2015 | Behravan | H04W 24/02 370/329 |
| 2015/0305083 A1* | 10/2015 | Heo | H04W 36/0088 370/329 |
| 2016/0007334 A1 | 1/2016 | Kim et al. | |
| 2016/0022760 A1 | 1/2016 | Perrow et al. | |
| 2016/0073344 A1 | 3/2016 | Vutukuri et al. | |
| 2016/0119969 A1 | 4/2016 | Vajapeyam et al. | |
| 2016/0128129 A1* | 5/2016 | Kahtava | H04W 52/0216 370/311 |
| 2016/0227602 A1 | 8/2016 | Yi et al. | |
| 2016/0255676 A1 | 9/2016 | Vajapeyam et al. | |
| 2017/0265248 A1* | 9/2017 | Narasimha | H04W 52/0216 |
| 2021/0112420 A1 | 4/2021 | Vajapeyam et al. | |

FOREIGN PATENT DOCUMENTS

| | | | | |
|---|---|---|---|---|
| CN | 102448151 A | 5/2012 | | |
| EP | 2315486 A1 | 4/2011 | | |
| EP | 2600673 A1 | 6/2013 | | |
| EP | 2693815 A1 * | 2/2014 | ............ | H04W 52/06 |
| EP | 2816858 A1 | 12/2014 | | |
| EP | 2521415 B1 | 3/2015 | | |
| EP | 3048847 A1 * | 7/2016 | ........ | H04W 52/0206 |
| EP | 2469939 B1 * | 9/2018 | ............ | H04L 5/0096 |
| EP | 3419208 A1 * | 12/2018 | ............ | H04W 76/28 |
| JP | 2010226747 A | 10/2010 | | |
| JP | 2012520046 A | 8/2012 | | |
| JP | 2012530406 A | 11/2012 | | |
| JP | 2014504474 A | 2/2014 | | |
| JP | 2014158298 A | 8/2014 | | |
| TW | 201412064 A | 3/2014 | | |
| WO | WO-2010078365 A1 * | 7/2010 | ........ | H04W 52/0216 |
| WO | WO-2011008002 A2 | 1/2011 | | |
| WO | WO-2013115695 A1 * | 8/2013 | ........ | H04W 52/0216 |
| WO | WO-2014021984 A1 | 2/2014 | | |
| WO | WO-2014025228 A1 | 2/2014 | | |
| WO | WO-2016064534 A1 | 4/2016 | | |

OTHER PUBLICATIONS

Huawei et al., "Synchronization Aspects for LAA Secondary Carriers," 3GPP Draft; R1-150391, 3rd Generation Partnership Project (3GPP), Mobile Competence Centre ; 650, Route Des Lucioles ; F-06921 Sophia-Antipolis Cedex ; France vol. Ran WG1, No. Athens, Greece; Feb. 9, 2015-Feb. 13, 2015 Feb. 8, 2015 (Feb. 8, 2015), pp. 1-6, XP050933601, Retrieved from the Internet: URL:http://www.3gpp.org/ftp/Meetings_3GPP_SYNC/RAN1/Docs/ [retrieved on Feb. 8, 2015].
International Search Report and Written Opinion—PCT/US2016/018083—ISA/EPO—Aug. 3, 2016.
Nokia Siemens Networks, et al., "On the possibility for implicit release of activated secondary component carriers", 3GPP Draft; R2-101077 CC Implicit Release, 3rd Generation Partnership Project (3GPP), Mobile Competence Centre; 650, Route Des Lucioles F-06921 Sophia Antipolis Cedex; France, TSG-Ran WG2, No. San Francisco, USA, Feb. 22, 2010, XP050421743, 2 Pages. [retrieved on Feb. 16, 2010).
Partial International Search Report—PCT/US2016/018083—ISA/EPO—Apr. 28, 2016.
Taiwan Search Report—TW109119184—TIPO—dated Oct. 7, 2020.
3GPP: "3rd Generation Partnership Project; Technical Specification Group Radio Access Network; Study on scalable UMTS Frequency Division Duplex (FDD) Bandwidth (Release 12)", 3GPP TR 25.701 v12.2.0 (Jun. 2014), Jul. 3, 2014 (Jul. 3, 2014), pp. 1,71, Retrieved from the Internet: URL: https://www.3gpp.org/ftp/Specs/archive/25_series/25.701/25701-c20.zip [retrieved on Oct. 15, 2020].

* cited by examiner

DISCONTINUOUS RECEPTION PROCEDURES WITH ENHANCED COMPONENT CARRIERS

CROSS REFERENCES

The present Application for Patent is a Continuation application of U.S. patent application Ser. No. 15/042,491, entitled "DISCONTINUOUS RECEPTION PROCEDURES WITH ENHANCED COMPONENT CARRIERS," filed Feb. 12, 2016, which claims priority to U.S. Provisional Patent Application No. 62/121,754, entitled "DRX Procedures with ECCS," filed Feb. 27, 2015, assigned to the assignee hereof, and expressly incorporated by reference herein.

BACKGROUND

The following relates generally to wireless communication, and more specifically to discontinuous reception (DRX) procedures with enhanced component carriers (eCCs). Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

In some cases, a UE may communicate with a base station using multiple component carriers in a carrier aggregation (CA) configuration. One or more of the component carriers may be configured with a transmission time interval (TTI) that is different from the TTI of the primary cell (PCell). Using component carriers with different TTI lengths may interfere with operation in DRX mode, which may result in inefficient power usage.

SUMMARY

Discontinuous reception (DRX) operation may be configured differently on enhanced component carriers (eCCs) than on a primary cell (PCell). In some cases, a user equipment (UE) may be configured with several different eCC DRX modes based on whether the eCC DRX configuration is coordinated with the PCell DRX configuration. For instance, an eCC DRX configuration may be coordinated with downlink (DL) TTI scheduling such that each DRX ON durations may correspond a DL burst duration of the corresponding eCC. The eCC DRX ON durations may also be scheduled according to hybrid automatic repeat request (HARQ) process scheduling. In some examples, eCC DRX ON durations may be based on listen-before-talk (LBT) procedures, such as clear channel assessment (CCA) procedures. In some examples, eCC DRX ON durations may be configured to contain (e.g., include) an uplink (UL) burst to enable channel state information (CSI) reporting. The eCC DRX may also configured to minimize interruption of the PCell.

A method of wireless communication is described. The method may include determining a carrier aggregation (CA) configuration that includes a first component carrier with a first channel usage procedure and a second component carrier with a second channel usage procedure. The first channel usage procedure may be different from the second channel usage procedure. In some cases, the method further includes determining a DRX configuration including a first configuration for the first component carrier and a second configuration for the second component carrier.

An apparatus for wireless communication is described. The apparatus may include means for determining a CA configuration that includes a first component carrier with a first channel usage procedure and a second component carrier with a second channel usage procedure. The first channel usage procedure may be different from the second channel usage procedure. The apparatus may also include means for determining a DRX configuration that includes a first configuration for the first component carrier and a second configuration for the second component carrier.

A further apparatus for wireless communication is described. The apparatus may include a processor, memory in electronic communication with the processor, and instructions stored in the memory and operable, when executed by the processor, to cause the apparatus to determine a CA configuration that includes a first component carrier with a first channel usage procedure and a second component carrier with a second channel usage procedure. The first channel usage procedure may be different from the second channel usage procedure. The instructions may also be operable to cause the apparatus to determine a DRX configuration that includes a first configuration for the first component carrier and a second configuration for the second component carrier.

A non-transitory computer-readable medium storing code for wireless communication is described. The code may include instructions executable to determine a CA configuration that includes a first component carrier with a first channel usage procedure and a second component carrier with a second channel usage procedure. The first channel usage procedure may be different from the second channel usage procedure. The instructions may be further executable to determine a DRX configuration that includes a first configuration for the first component carrier and a second configuration for the second component carrier.

In some examples of the method, apparatuses, or non-transitory computer-readable medium described herein, the first channel usage procedure is based at least in part on monitoring or transmitting using a first transmission time interval (TTI) length and the second channel usage procedure is based at least in part on monitoring or transmitting using a second TTI length different than the first TTI length. In some examples the first TTI length is an LTE subframe and the second TTI length is an LTE symbol period.

In some examples of the method, apparatuses, or non-transitory computer-readable medium described herein, the second channel usage procedure is based at least in part on a CCA procedure and the first channel usage procedure is based at least in part on a non-CCA procedure. Additionally or alternatively, in some examples the second component carrier is in a shared or unlicensed spectrum. In some examples, the second channel usage procedure is based at least in part on a listen-before-talk (LBT) procedure and the first channel usage procedure is based at least in part on a non-LBT procedure.

In some examples of the method, apparatuses, or non-transitory computer-readable medium described herein, the second configuration is based at least in part on a channel acquisition timer. Additionally or alternatively, some examples may include processes, features, means, or instructions for monitoring by a UE whether a channel has been acquired by a base station during the channel acquisition timer, and for managing the DRX configuration by the UE based on the monitoring. In some cases, the second configuration may be based at least in part on the channel acquisition timer.

Some examples of the method, apparatuses, or non-transitory computer-readable medium described herein may further include processes, features, means, or instructions for receiving a DRX initiation message, and initiating a DRX ON duration according to the second configuration based at least in part on the DRX initiation message. Additionally or alternatively, in some examples the DRX initiation message is transmitted based at least in part on a CCA for the second carrier.

Some examples of the method, apparatuses, or non-transitory computer-readable medium described herein may further include processes, features, means, or instructions for receiving a DRX command message for the second carrier on the first component carrier, and transitioning to a DRX OFF state on the second component carrier based at least in part on the DRX command message.

Some examples of the method, apparatuses, or non-transitory computer-readable medium described herein may further include processes, features, means, or instructions for deactivating at least one radio component for communication on the second carrier for a first period of time according to the second configuration, activating the radio component for an ON duration after the first period of time has elapsed, and receiving a control channel message on the second carrier during the ON duration. In some cases, the control channel message may indicate a burst length during the ON duration. Additionally or alternatively, some examples may include processes, features, means, or instructions for receiving an indication of a DL burst length during the ON duration.

Some examples of the method, apparatuses, or non-transitory computer-readable medium described herein may further include processes, features, means, or instructions for configuring a wireless device with the CA configuration and the DRX configuration. Additionally or alternatively, some examples may include processes, features, means, or instructions for transmitting an indication of a DL burst length during an ON duration of the second configuration.

In some examples of the method, apparatuses, or non-transitory computer-readable medium described herein, the DRX configuration includes one or more DRX modes. Each mode may correspond to a relation between the first configuration and the second configuration. Additionally or alternatively, in some examples a mode of the one or more DRX modes specifies that the first configuration is independent of the second configuration.

In some examples of the method, apparatuses, or non-transitory computer-readable medium described herein, a mode of the one or more DRX modes includes a DRX ON duration of the second configuration associated with at least one DRX ON duration of the first configuration. Additionally or alternatively, in some examples a mode of the one or more DRX modes specifies that the first configuration is independent of the second configuration during OFF durations of the first configuration and that a DRX ON duration of the second configuration associated with each DRX ON duration of the first configuration.

In some examples of the method, apparatuses, or non-transitory computer-readable medium described herein, the first component carrier is a primary cell (PCell) and the second component carrier is an enhanced component carrier (eCC) SCell. Additionally or alternatively, in some examples the first configuration is based at least in part on at least one first DRX timer and the second configuration is based at least in part on at least one second DRX timer.

In some examples of the method, apparatuses, or non-transitory computer-readable medium described herein, the second configuration comprises a DL TTI associated with each ON duration of the second configuration. Additionally or alternatively, in some examples the DL TTI associated with each ON duration of the second configuration is configured with DL control information directed toward the UE.

In some examples of the method, apparatuses, or non-transitory computer-readable medium described herein, a DL burst configuration of the second component carrier includes a final DL TTI for each DL burst that occurs during an ON duration of the second configuration. Additionally or alternatively, in some examples each ON duration of the second configuration is extended to include a final DL TTI for a DL burst of the second component carrier.

Some examples of the method, apparatuses, or non-transitory computer-readable medium described herein may further include processes, features, means, or instructions for receiving an indication of a scheduled UL burst during the final DL TTI of an ON duration of the second configuration, and transmitting an acknowledgement (ACK) for a HARQ process associated with the second carrier based at least in part on the indication. Additionally or alternatively, in some examples the second configuration includes an UL burst within an ON duration.

Some examples of the method, apparatuses, or non-transitory computer-readable medium described herein may further include processes, features, means, or instructions for transmitting a channel state information (CSI) message using a TTI of the UL burst. Additionally or alternatively, in some examples the second configuration includes a first set of ON durations co-extensive with a set of ON durations of the first configuration and a second set of ON durations within at least one OFF duration of the first configuration.

Some examples of the method, apparatuses, or non-transitory computer-readable medium described herein may further include processes, features, means, or instructions for rating match a data transmission on the first carrier based at least in part on symbol level interruption of the first carrier associated with an ON duration associated with the second configuration.

BRIEF DESCRIPTION OF THE DRAWINGS

The disclosure may be understood by reference to the following drawings.

DETAILED DESCRIPTION

Discontinuous reception (DRX) operation may be configured differently on enhanced component carriers (eCCs) than on a primary cell (PCell), as described herein. The description herein includes illustrative examples in the context of a wireless communication system, including examples of different aspects of eCC DRX configurations. For instance, a base station may coordinate eCC ON durations with eCC downlink (DL) and uplink (UL) bursts to support active UE operation during certain symbol periods, such as a pre-configured DL symbol, a first DL symbol in a DL burst, or a final DL symbol in a DL burst. This may enable the UE to receive DL control information. A base station may also coordinate eCC scheduling and DRX to support UE awareness of UL burst availability for UL symbol transmission. Additionally, some of the described examples illustrate an eCC DRX configuration designed to accommodate communication in shared or unlicensed spectrum using listen-before-talk (LBT) operations, when a UE may transmit channel state information (CSI), and how an eCC DRX configuration may be designed to manage interference with a PCell. Other aspects of the description are illustrated by and described with reference to apparatus diagrams, system diagrams, and flowcharts that support DRX operation on eCCs.

Figure 1:
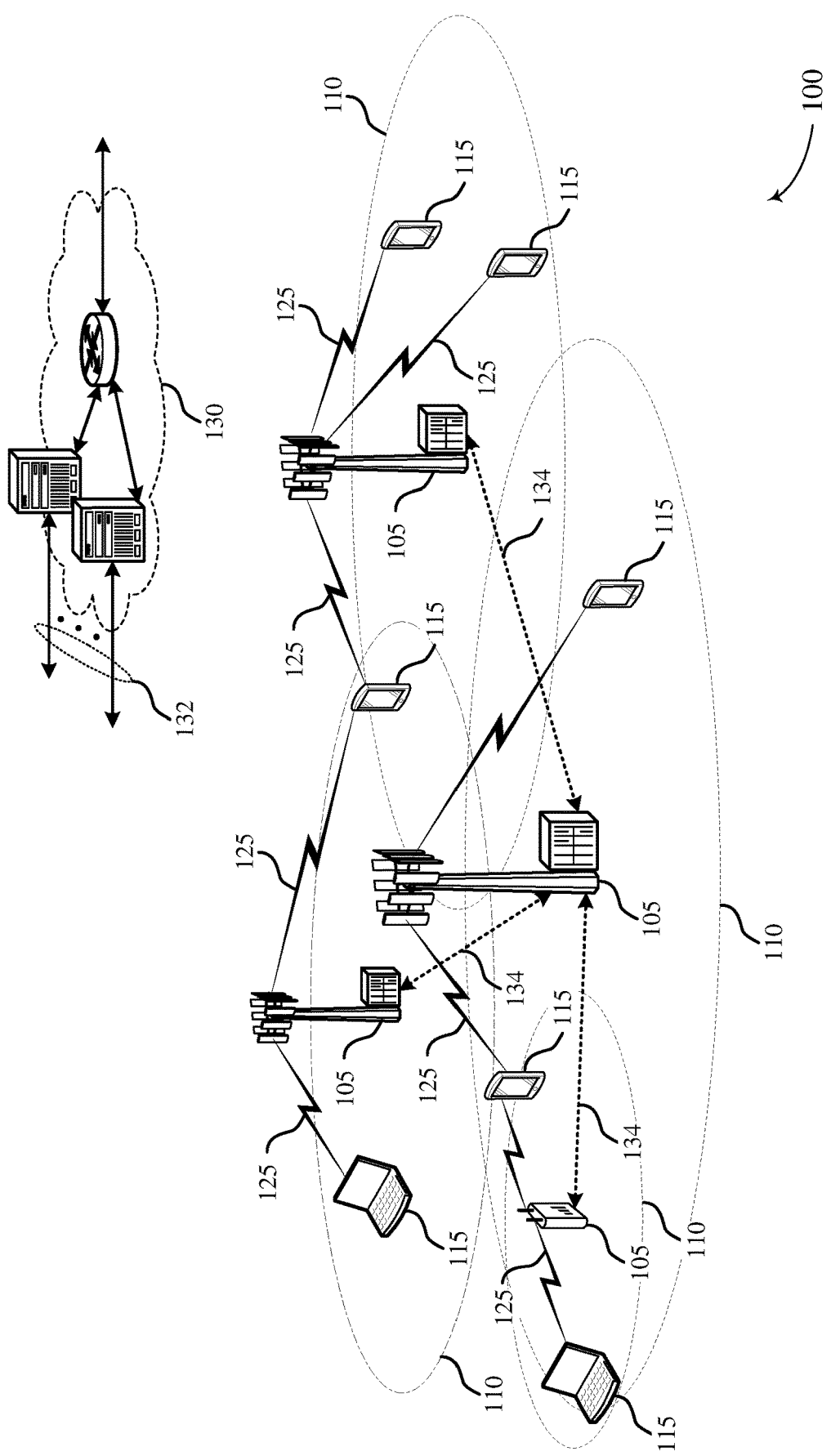
FIG. 1 illustrates an example of a wireless communications system that supports discontinuous reception (DRX) procedures with enhanced component carriers (eCCs) in accordance with various aspects of the present disclosure.

FIG. 1 illustrates an example of a wireless communications system 100 that supports DRX procedures with eCCs in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

The base stations 105 may wirelessly communicate with the UEs 115 via one or more base station antennas. Each of the base stations 105 may provide communication coverage for a respective geographic coverage area 110. The communication links 125 shown in wireless communications system 100 may include UL transmissions from a UE 115 to a base station 105, or DL transmissions, from a base station 105 to a UE 115. The base stations 105 may support, and may communicate with one another to support, DRX procedures with eCCs. For example, the base stations 105 may interface with the core network 130 through backhaul links 132 (e.g., S1, etc.). The base stations 105 may also communicate with one another over backhaul links 134 (e.g., X1, etc.) either directly or indirectly (e.g., through core network 130). The base stations 105 may perform radio configuration and scheduling for communication with the UEs 115, or may operate under the control of a base station controller (not shown). In various examples, base stations 105 may be macro cells, small cells, hot spots, or the like. The base stations 105 may also be referred to as eNodeBs (eNBs) 105 in some examples.

The UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like. The UEs 115 may communicate with base stations 105, and may support DRX procedures with eCCs.

A UE may be configured with multiple carriers in carrier aggregation (CA) configuration, and the communication links 125 may represent such multicarrier CA configurations. A carrier may also be referred to as a component carrier (CC), a layer, a channel, etc. The term "component carrier" may refer to each of the multiple carriers utilized by a UE in CA operation, and may be distinct from other portions of system bandwidth. For instance, a component carrier may be a relatively narrow-bandwidth carrier capable of being utilized independently or in combination with other component carriers. Each component carrier may provide the same capabilities as an isolated carrier based on release 8 or release 9 of the LTE standard. Multiple component carriers may be aggregated or utilized concurrently to provide some UEs 115 with greater bandwidth and, e.g., higher data rates. Thus, individual component carriers may be backwards compatible with legacy UEs 115 (e.g., UEs 115 implementing LTE release 8 or release 9); while other UEs 115 (e.g., UEs 115 implementing post-release 8/9 LTE versions), may be configured with multiple component carriers in a multi-carrier mode. A carrier used for DL may be referred to as a DL CC, and a carrier used for UL may be referred to as an UL CC. A UE 115 may be configured with multiple DL CCs and one or more UL CCs for carrier aggregation. Each carrier may be used to transmit control information (e.g., reference signals, control channels, etc.), overhead information, data, etc.

Thus, a UE 115 may communicate with a single base station 105 utilizing multiple carriers, and may also communicate with multiple base stations 105 simultaneously on different carriers. Each cell of a base station 105 may include an UL CC and a DL CC. The coverage area 110 of each serving cell for a base station 105 may be different (e.g., CCs on different frequency bands may experience different path loss). In some examples, one carrier is designated as the primary carrier, or primary component carrier (PCC), for a UE 115, which may be served by a primary cell (PCell). Primary cells may be semi-statically configured by higher layers (e.g., radio resource control (RRC), etc.) on a per-UE basis. Certain uplink control information (UCI), e.g., ACK/NACK, channel quality indicator (CQI), and scheduling information transmitted on physical uplink control channel (PUCCH), are carried by the primary cell. Additional carriers may be designated as secondary carriers, or secondary component carriers (SCC), which may be served by secondary cells (SCells). Secondary cells may likewise be semi-statically configured on a per-UE basis. In some cases, secondary cells may not include or be configured to transmit the same control information as the primary cell.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation configuration or a dual connectivity configuration (e.g., when multiple serving cells have a sub-optimal backhaul link). An eCC may also be configured for use in unlicensed spectrum or shared spectrum (e.g., where more than one operator is licensed to use the spectrum). An eCC characterized by flexible bandwidth may include one or more segments that may be utilized by UEs 115 that are not capable of monitoring the whole bandwidth or prefer to use a limited bandwidth (e.g., to conserve power).

In some cases, an eCC may utilize a different TTI length than other CCs, which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may also be associated with increased subcarrier spacing. In conjunction with the reduced TTI length, an eCC may utilize dynamic time-division duplex (TDD) operation (i.e., it may switch from DL to UL operation for short bursts according to dynamic conditions).

Flexible bandwidth and variable TTIs may be associated with a modified control channel configuration (e.g., an eCC may utilize an enhanced physical downlink control channel (ePDCCH) for DL control information). For example, one or more control channels of an eCC may utilize frequency-division multiplexing (FDM) scheduling to accommodate flexible bandwidth use. Other control channel modifications include the use of additional control channels (e.g., for eMBMS scheduling, or to indicate the length of variable length UL and DL bursts), or control channels transmitted at different intervals. An eCC may also include modified or additional HARQ related control information. A UE 115 may operate on an eCC, and other CCs, using discontinuous reception.

Discontinuous reception (DRX) may also be used in wireless communications system 100 to conserve battery power at UEs 115. A DRX cycle may consist of an "ON duration" when the UE 115 may monitor for control information (e.g., on PDCCH) and a "DRX period" when the UE 115 may power down certain radio components. In some cases, DRX may conserve power at a UE 115 by allowing the UE 115 enter a low power state. The UE 115 may monitor the physical downlink control channel (PDCCH) during ON durations, which may be triggered by the expiration of a timer after communications end during an ON duration, or by explicit signaling. In some cases, a DRX ON duration, or DRX ON cycle, is referred to as a period or time during which a UE 115 is "awake." So, in some cases, a UE 115 that transitions from into an ON duration is said to "wake" or "wake up." Similarly, a UE 115 that enters a low power state associated with a DRX cycle may be said to "sleep" or to be "asleep." Accordingly, in some cases, a UE 115 that transitions from an ON duration to a DRX period is said to "go to sleep." In a connected DRX mode (or connected mode DRX), a UE 115 may maintain an RRC connection with a base station 105 (e.g., operate in RRC CONNECTED mode) while "sleeping" (e.g., powering down some components) for some predetermined interval.

In some cases, a UE 115 may be configured with a short DRX cycle and a long DRX cycle. A UE 115 may, for instance, enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the ON duration. While monitoring PDCCH for a scheduling message, the UE 115 may initiate a DRX Inactivity timer. If a scheduling message is successfully received, the UE 115 may prepare to receive data and the DRX Inactivity timer may be reset. When the DRX Inactivity timer expires without receiving a scheduling message, the UE 115 may move into a short DRX cycle and may start a DRX Short Cycle Timer. When the DRX Short Cycle Timer expires, the UE 115 may resume a long DRX cycle.

There may be a number of timers associated with a DRX configuration. For example, there may be long DRX parameters and short DRX parameters, which may be optional. The long DRX parameters may include an ON duration timer, which may be the duration in PDCCH subframes that the UE 115 monitors PDCCH after waking up from DRX (e.g., 1-200 PDCCH subframes). The long DRX parameters may further include a inactivity timer, which may be the duration in PDCCH subframes that the UE 115 waits to successfully decode a PDCCH, from the last successful decoding of a PDCCH for a new transmission (e.g., 0-2560 PDCCH subframes). The long DRX parameters may further include a long DRX cycle, which may be the duration in subframes between successive ON duration cycles (e.g., 10-2560 subframes), and a DRX retransmission timer which may be the duration in DL subframes that the UE 115 monitors PDCCH when a HARQ retransmission is pending (e.g., 1-33 subframes). The short DRX parameters may include a short DRX cycle (e.g., 2-640 subframes) and a DRX Short Cycle Timer (e.g., 1-16 cycles).

DRX operation may be configured differently on eCCs than on a PCell or a non-eCC SCell. For example, a UE 115 may be configured with several different eCC DRX modes based on whether the eCC DRX configuration is coordinated with a PCell DRX configuration. The eCC DRX configuration may also be coordinated to account for control communications such as hybrid automatic repeat request (HARQ), channel state information (CSI), and clear channel assessment (CCA) procedures, as described below. The eCC DRX configuration may be based on timers similar to those of the PCell DRX timers described above, or may be based on a different set of timers than those of the PCell.

Figure 2:
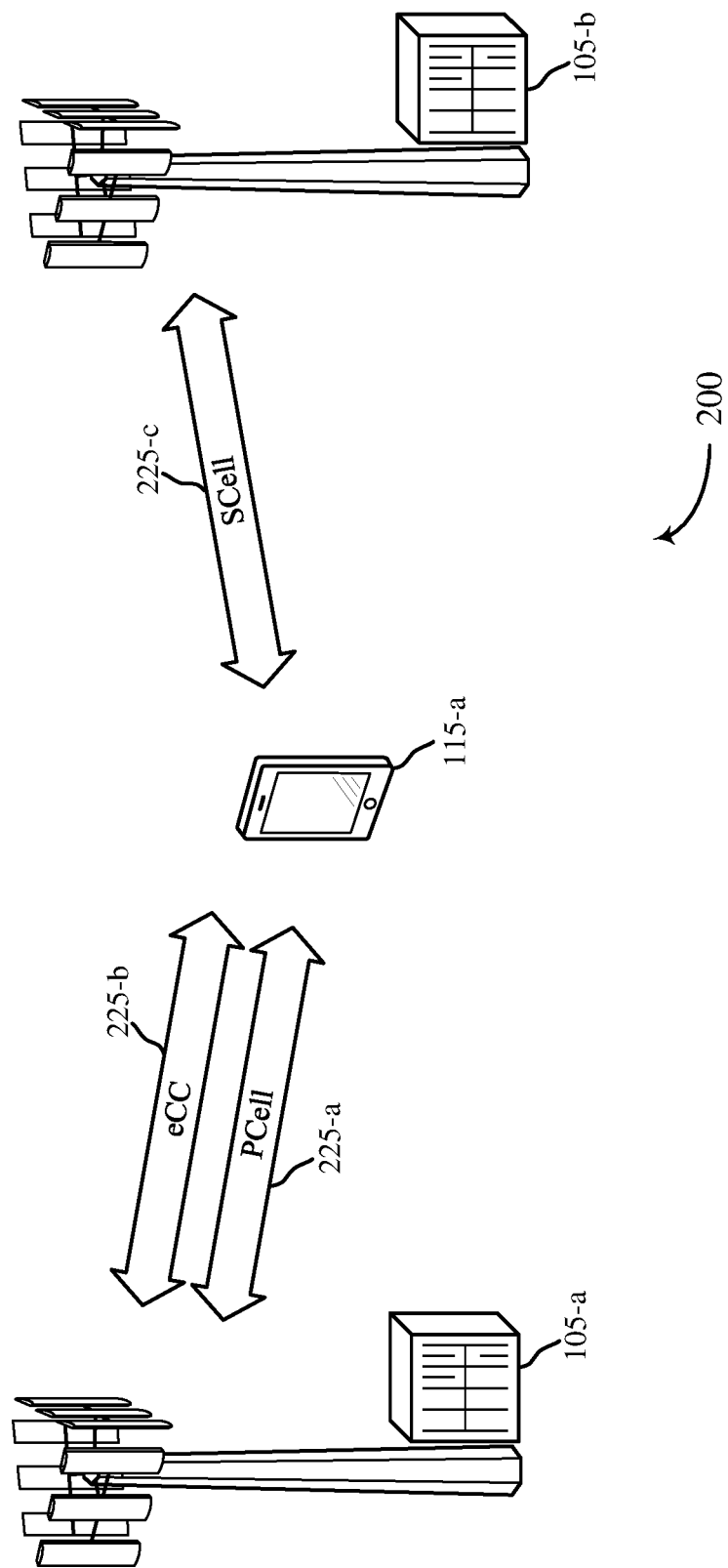
FIG. 2 illustrates an example of a wireless communications system that supports DRX procedures with eCCs in accordance with various aspects of the present disclosure.

FIG. 2 illustrates an example of a wireless communications system 200 for DRX procedures with eCCs in accordance with various aspects of the present disclosure. Wireless communications system 200 may illustrate aspects of the wireless communications system 100. The wireless communications system 200 includes base stations 105-*a* and 105-*b* that may be examples of aspects of the base station 105 described with reference to FIG. 1. The wireless communications system 200 also includes a UE 115-*a* that may be an example of aspects of the UE 115 described with reference to FIG. 1. In other examples, the wireless communications system 200 includes other numbers of base stations 105 and UEs 115.

The base stations 105-*a* and 105-*b* may communicate with UE 115-*a* utilizing component carriers 225. One of component carriers 225 (e.g., 225-*b*) may be an enhanced component carrier (eCC). While not shown, a CA configuration may include several eCCs. The component carriers 225 may include forward (e.g., DL) channels and reverse (e.g., UL) channels. Component carriers 225 can be in the same frequency operating band (intra-band) or in different operating bands (inter-band), and intra-band CCs can be contiguous or non-contiguous within the operating band. Furthermore, one or more of the component carriers 225 can be in an unlicensed radio frequency spectrum band, which may be shared among different devices and operators of various systems. UE 115-a may be configured for DRX operation with different DRX configurations associated with the different component carriers 225. For example, eCC 225-b may have a different DRX configuration from non-eCC cells.

One component carrier (CC) may be designated as the primary CC or PCell 225-a for UE 115-a. PCell 225-a may be semi-statically configured by higher layers (e.g., using radio resource control (RRC) signaling) on a per-UE basis. As mentioned, one or more of the other secondary cells (SCells) 225-c may be eCCs. Certain control information (e.g., HARQ acknowledgements (ACKs), channel state information (CSI), DL/UL grants, scheduling requests (SR), etc.) related to data transmission on eCC may be carried by the PCell 225-a. In some cases, the eCC DRX configuration for eCC 225-b may be coordinated with a DRX configuration for PCell 225-a, (e.g., to ensure that UE 115-a can transmit and receive the appropriate control information on PCell 225-a). In some examples, the PCell 225-a is a non-eCC LTE carrier. In some examples, SCells 225-b and 225-c may both be eCC cells.

In some cases, UEs 115-a may achieve battery savings by limiting wake-up time for DL control monitoring on eCC 225-b according to a DRX configuration. However, eCC 225-b may have a shorter TTI than PCell 225-a, and may be configured for ultra-low latency (ULL) operation. That is, UE 115-a may have UL and DL subframes determined dynamically and scheduling may be performed bursts (e.g., in dynamically scheduled sequences of DL TTIs followed by a burst of UL TTIs). Furthermore, in some cases eCC 225-b may operate on an unlicensed carrier, which may result in further changes to the DRX configuration. Thus, the DRX configuration for eCC 225-b may be configured based on different considerations. For example, DRX for eCC 225-b may be configured to accommodate the bursty scheduling, ULL HARQ, CSI reporting, and listen-before-talk (LBT) procedures (e.g., on an unlicensed spectrum).

Thus, the DRX configuration for UE 115-a may include multiple sub configurations (e.g., for eCC 225-a and PCell 225-a) which may be coupled, partially coupled, or decoupled. For example, in some cases, UE 115-a may be configured such that each PCell DRX ON state may correspond to at least one eCC DRX ON periods. As another example, the eCC DRX configuration may be completely independent from the PCell DRX configuration. The eCC DRX configuration may be based on eCC specific DRX timers, and the UE 115-a may be in a DRX ON state in eCC while in a DRX OFF state in PCC and vice versa.

Figure 3:
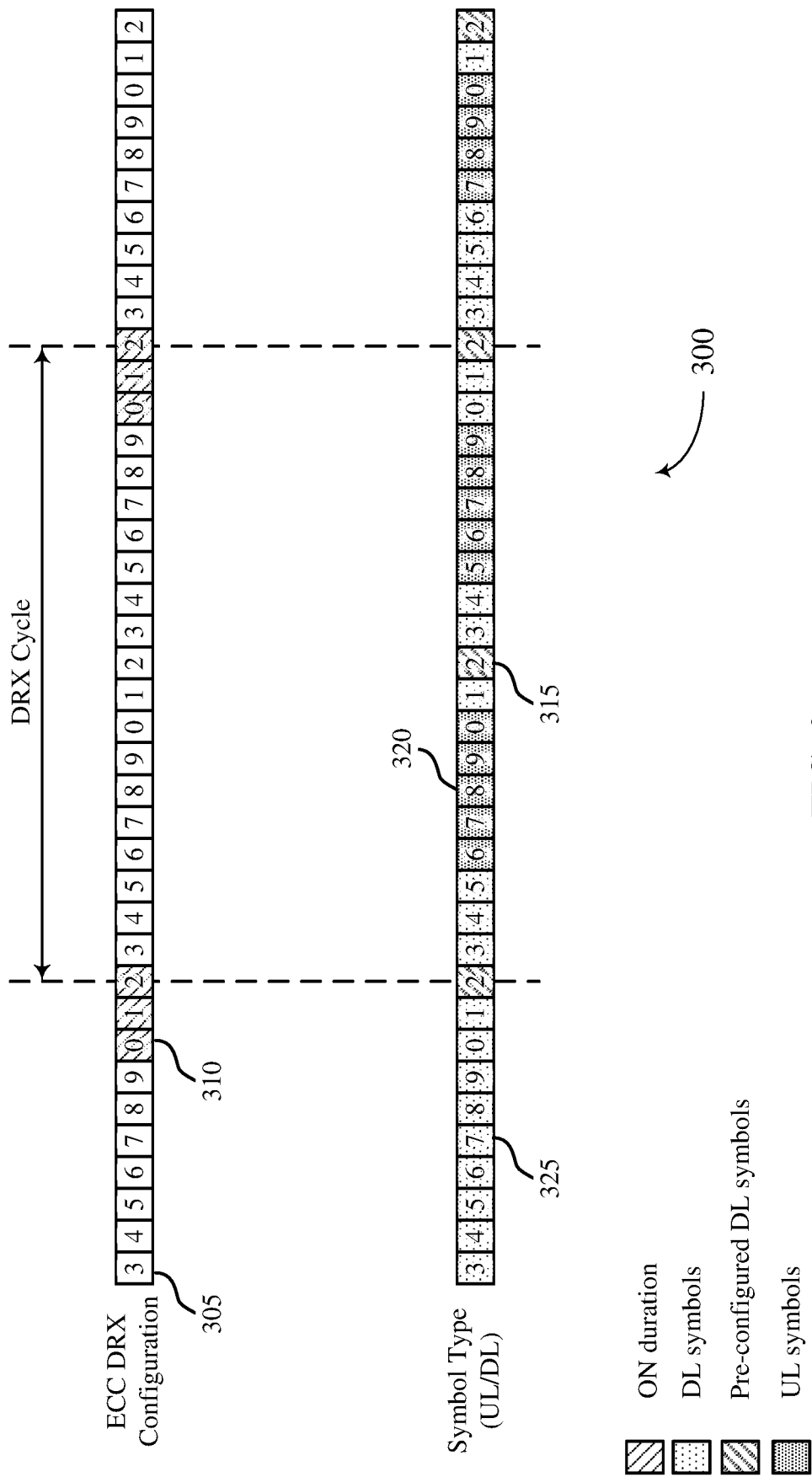
FIGS. 3-7 illustrate example timing diagrams for system operation that supports DRX procedures with eCCs in accordance with various aspects of the present disclosure.

FIG. 3 illustrates an example of a timing diagram 300 for a system that supports DRX procedures with eCCs in accordance with various aspects of the present disclosure. Timing diagram 300 shows an eCC DRX configuration with pre-configured DL symbols to allow a UE 115 in DRX operation to receive at least one DL symbol during each DRX ON duration. This may enable the UE 115 to receive DL control information. An eCC DRX configuration is shown along with the symbol type or transmission time interval (TTI) type. Timing diagram 300 may include a sequence of symbols 305, during which a UE 115 may deactivate one or more radio component during DRX sleep periods (e.g., DRX periods, as described above) and then wake (e.g., wake up, as described above) to monitor the eCC during ON duration symbols 310. In some examples, the ON duration symbols 310 may occur when an ON duration timer is active.

The UE 115 may not monitor the control channel (such as the PDCCH or ePDCCH) during DRX sleep symbols (e.g., symbols during which a UE 115 is asleep) not included in the set of ON duration symbols 310. At times, ON duration symbols 310 and the other symbols 305 which occur before other ON duration symbols 310 may be considered a DRX cycle, which may be repeated (e.g., periodically). The symbol types may include DL symbols 325 as well as UL symbols 320 from an base station 105.

A UE 115 may not know a priori if a symbol 305 is used for UL or DL when it wakes for the ON duration symbols 310. Furthermore, it may be beneficial for a UE 115 to ensure that at least one DL symbol is configured during each eCC ON duration 310. Thus, the eCC DRX may be configured such that certain pre-configured DL symbols 315 are scheduled while the UE 115 is in a DRX ON state. The pre-configured DL symbols 315 may be predefined, signaled, determined in quasi-real time, or determined periodically. In some cases, the pre-configured DL symbols 315 may be configured explicitly for a single UE 115. In some cases, the base station 105 may provide at least one pre-configured DL symbol 315 during certain wake-up periods (e.g., ON durations) for the UE 115.

Figure 4A:
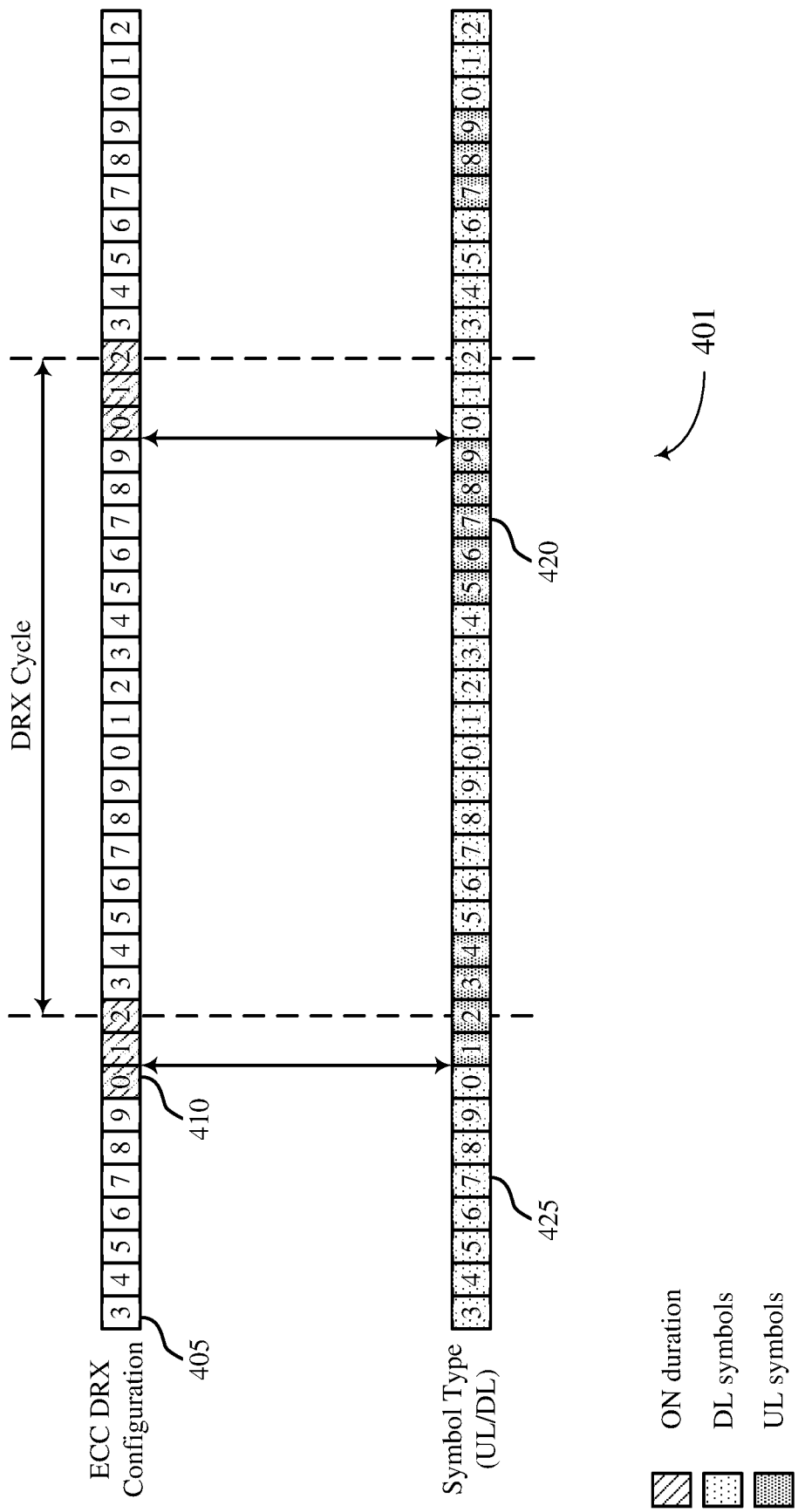
Figure 4B:
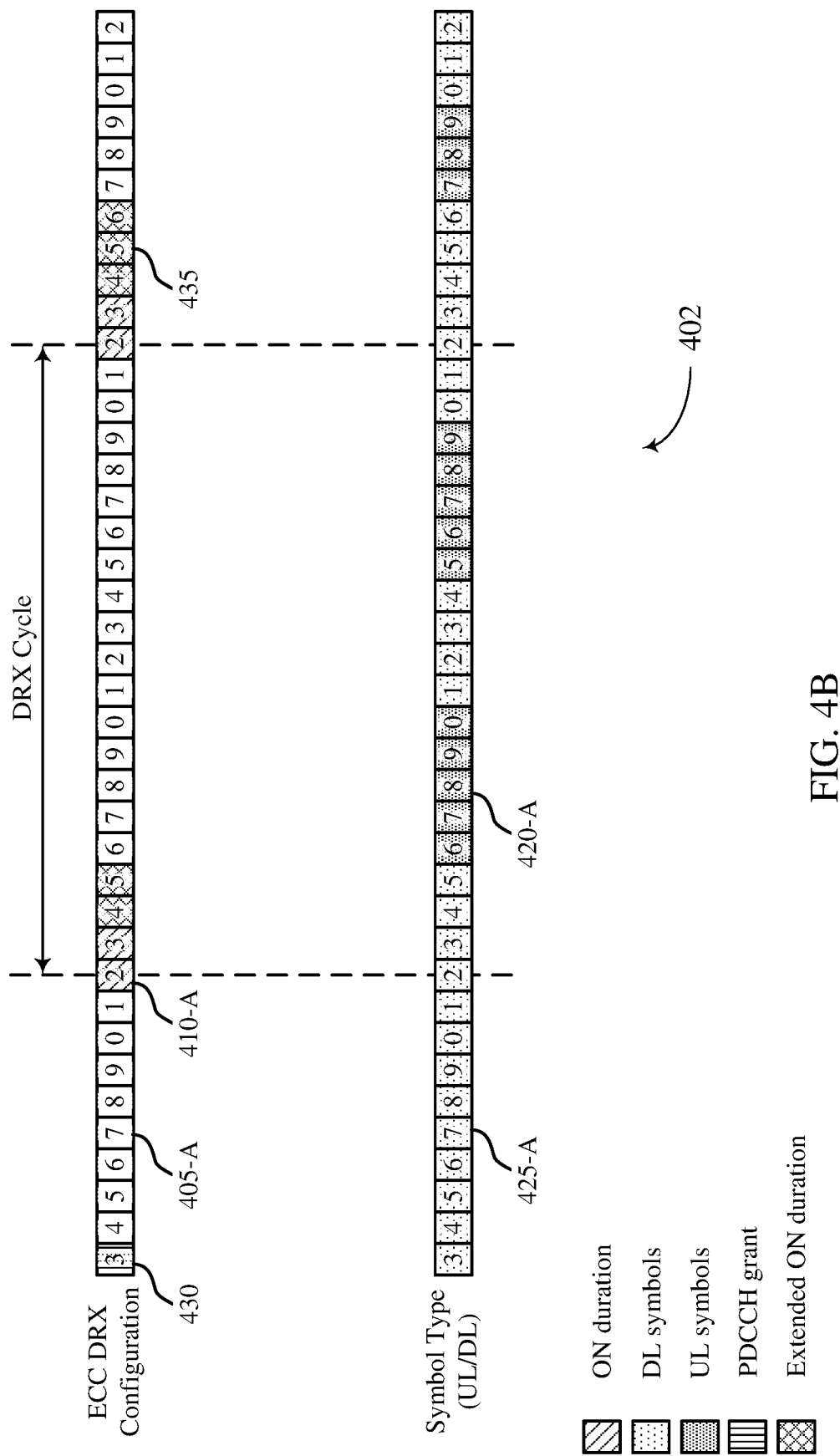
Figure 4C:
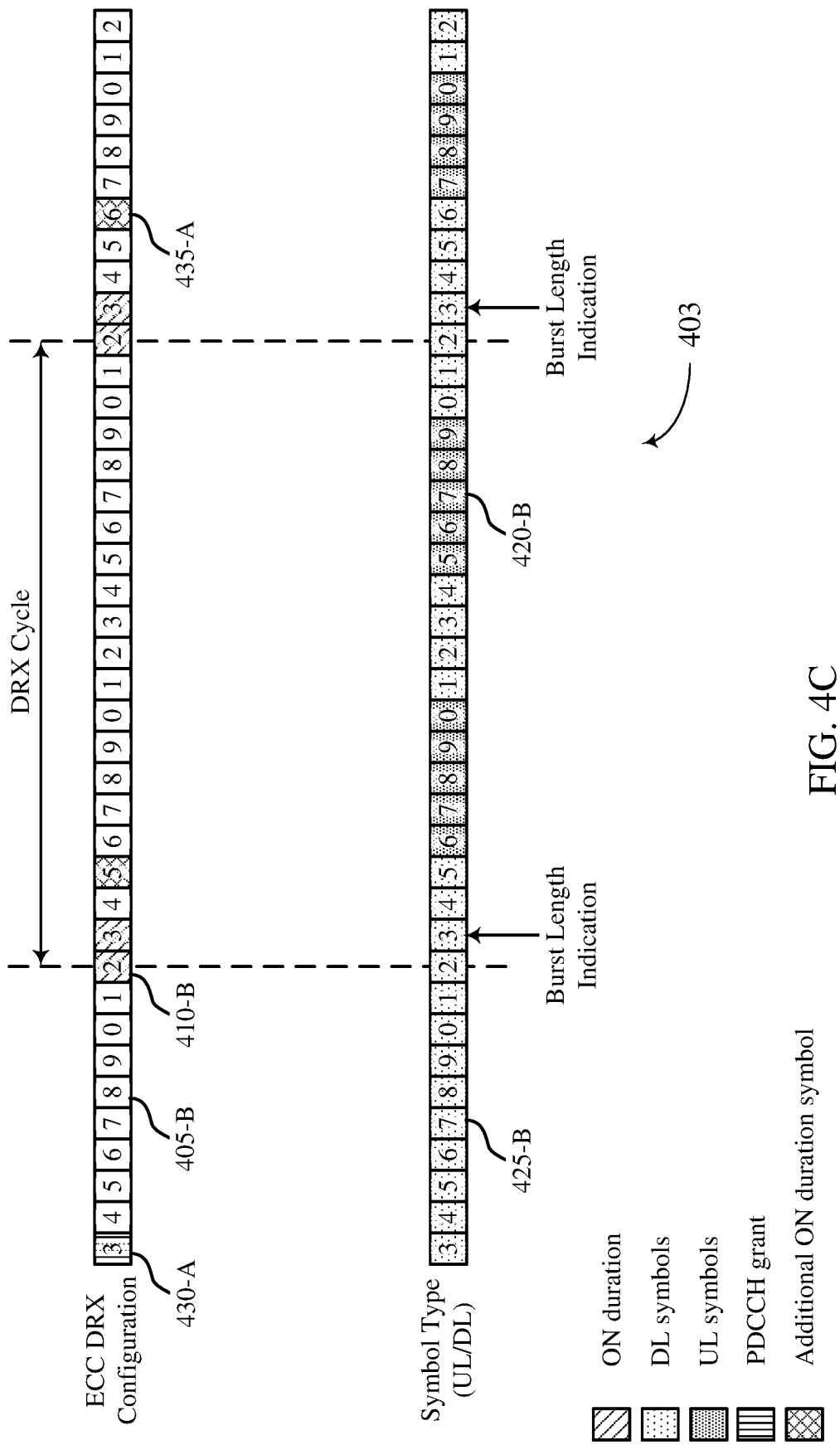

FIGS. 4A, 4B, and 4C illustrate an example or examples of a timing diagrams 401, 402, and 403 for systems that support DRX procedures with eCCs in accordance with various aspects of the present disclosure. For instance, wireless communications systems 100 and 200 of FIGS. 1 and 2 may support communication according to timing diagrams 401, 402, and 403. Timing diagrams 401, 402, and 403 illustrate alternatives that may allow a UE 115 with an eCC DRX configuration to know when a DL burst is going to end (or, alternatively, when an UL burst will begin) in order to determine whether a time for UL transmissions will become available during the DRX ON duration. The timing diagrams may include symbols 405 which may include features of symbols 305 of FIG. 3, ON duration symbols 410 which may include features of ON duration symbols 310 of FIG. 3, UL symbols 420 which may include features of UL symbols 320 of FIG. 3, and DL symbols 425 which may include features of DL symbols 325 of FIG. 3.

At times, a UE may wake up in the middle of an ongoing burst of DL symbols 425. This may prevent the UE from knowing when the DL burst 425 will end. For example, the duration of the DL burst 425 may be signaled at the beginning of the DL burst 425. Further, the UE may not know when the subsequent UL burst 420 starts, which may be interfere with the ability to transmit an uplink control information (UCI) or hybrid automatic repeat request (HARQ) transmission.

HARQ may be a method of ensuring that data is received correctly over a wireless communication link. HARQ may include a combination of error detection (e.g., using a cyclic redundancy check (CRC)), forward error correction (FEC), and retransmission (e.g., a hybrid automatic repeat request (HARQ)). HARQ may improve throughput at the media access control (MAC) layer in poor radio conditions (e.g., signal-to-noise conditions). In Incremental Redundancy HARQ, incorrectly received data may be stored in a buffer and combined with subsequent transmissions to improve the overall likelihood of successfully decoding the data. In some cases, redundancy bits are added to each message prior to transmission. This may be especially useful in poor conditions. In other cases, redundancy bits are not added to each transmission, but are retransmitted after the transmitter of the original message receives a negative-acknowledgment (NACK) indicating a failed attempt to decode the information. If a UE 115 wakes-up in the middle of an ongoing burst, the UE 115 may not know when it may send UL transmissions relating to UCI or HARQ. For example, a UE may locate an ACK resource, such as based on the beginning or end of a burst, and wake-up for its transmission or reception. Further, in some cases if UE 115 reports UL ACK, the UE 115 may return to a DRX sleep state, and otherwise the UE 115 may wake-up after a HARQ round trip time (RTT) for a possible retransmission grant, and may remain awake during the duration of a retransmission timer.

According to the example of FIG. 4A, a base station 105 may adjust the duration of bursts, such that the bursts terminate or start when the UE 115 is in a DRX ON state. The base station 105 may adjust the duration of bursts based on the status of the UE 115. By adjusting the duration of bursts, the base station 105 may ensure that ON duration symbols 410 overlap with the beginning or end of a DL burst 425 (or in some cases, an UL burst 420), therefore enabling the UE 115 to receive control information relating to the DL burst 425 or the UL burst 420. For example, this may enable the UE 115 to receive a PDCCH transmission during a DRX ON duration 410.

According to the example of FIG. 4B, a UE 115 may wake-up for a DRX ON duration and stay awake until the end of a DL burst is detected. For example, the UE 115 may be scheduled to use ON duration symbols 410-a, which may include features of the ON duration symbols 410 of FIG. 4A. During this period the UE 115 may monitor PDCCH during the DRX ON state, and the ON duration symbols 410-a may be extended into additional ON duration symbols 435. Additional ON duration symbols 435 may extend the ON duration until the end of a burst is detected, such as DL burst 425-a. In some cases, if the UE 115 is scheduled during its DRX ON state, it may receive a DRX command (e.g., via a MAC control element) to return to a DRX sleep state. In some cases, the additional ON duration symbols 435 may overlap with one or more symbols of a next burst period, such as UL burst 420-a, which may include features of UL burst 420 of FIG. 4A. In some cases, the ON duration may stop before overlapping with an UL burst period (e.g., UL burst 420-a). In some cases, the UE 115 may monitor the channel to receive a DL burst indication 430 for a DL transmission indicating how long the DL burst will last. This may enable the UE 115 to add the additional ON duration symbols 435.

According to the example of FIG. 4C, a UE 115 may acquire a burst length indication (e.g., via a PDCCH or ePDCCH) and add an additional non-contiguous TTI to an ON duration. For example, a DL burst indication 430-a may be transmitted to the UE 115 by a base station 105. The indication may be dedicated signaling, or it may be signaled to a group UEs 115 using a dedicated physical (PHY) broadcast channel. The length indication may indicate the end of a DL burst period to the UE 115 if the UE 115 misses the control channel containing the burst scheduling. The UE 115 may then wake up for the original ON duration symbols 410-b and wake up again for an additional period. In some cases, the UE 115 may receive a length indication during the middle of a DL burst during the ON duration symbols 410-b or when the UE 115 is in a DRX ON state (e.g., awake). The length indication may be used to determine a time for the UE 115 to be in a DRX ON state.

For example, the UE 115 may wake up during additional ON duration symbols 435-a. The additional ON duration symbols 435-a may overlap with the end of a DL burst (such as DL burst 425-a) or the beginning of an UL burst (such as UL burst 420-b). By receiving the length indication and adding a single symbol at the end of DL burst 425-b, the UE 115 may reduce the number of additional ON duration symbols 435-a—e.g., compared to remaining in an active state during the intermediate symbols between the ON duration symbols 410 and the additional ON duration symbols 435.

Figure 5A:
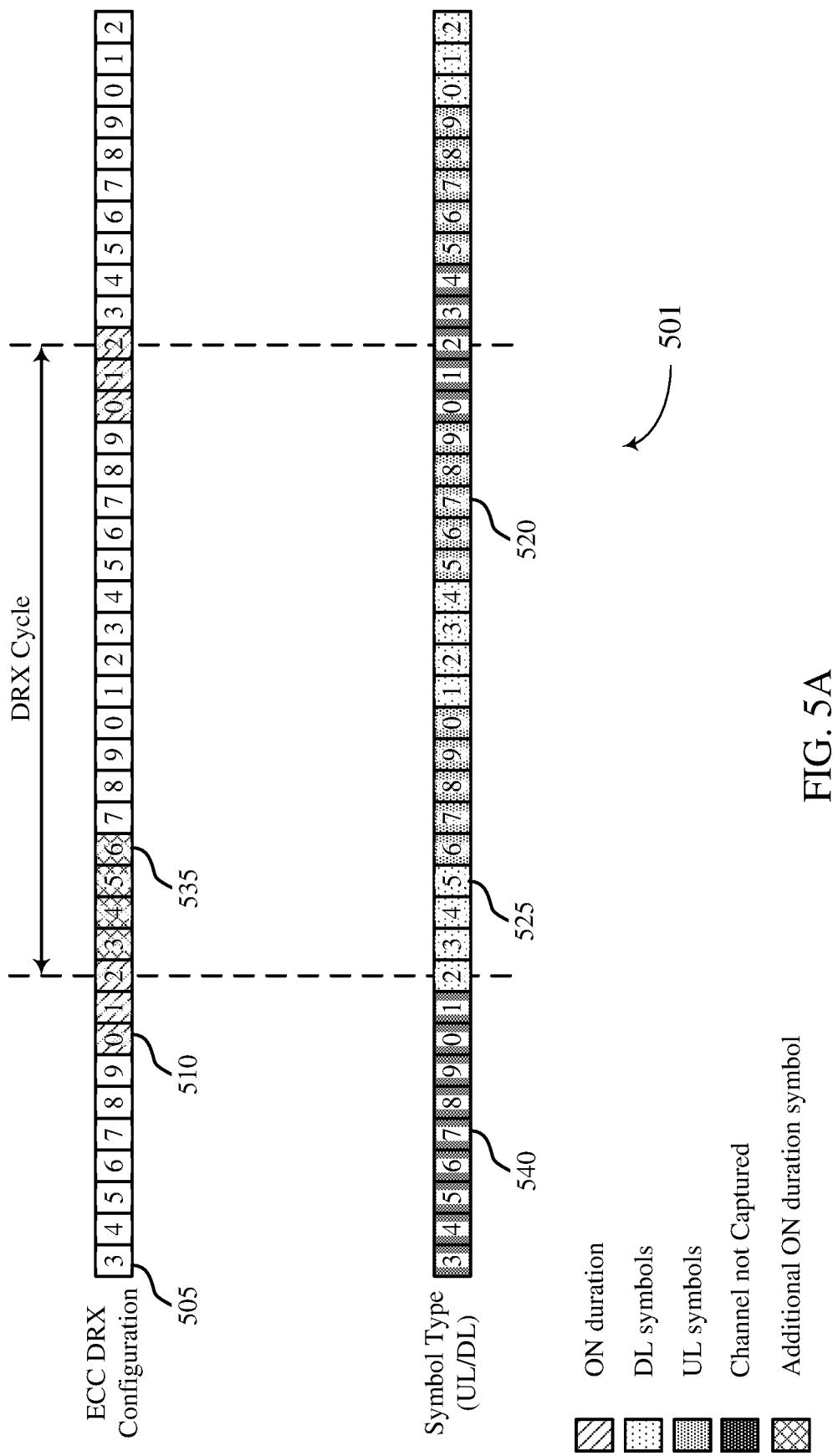
Figure 5B:
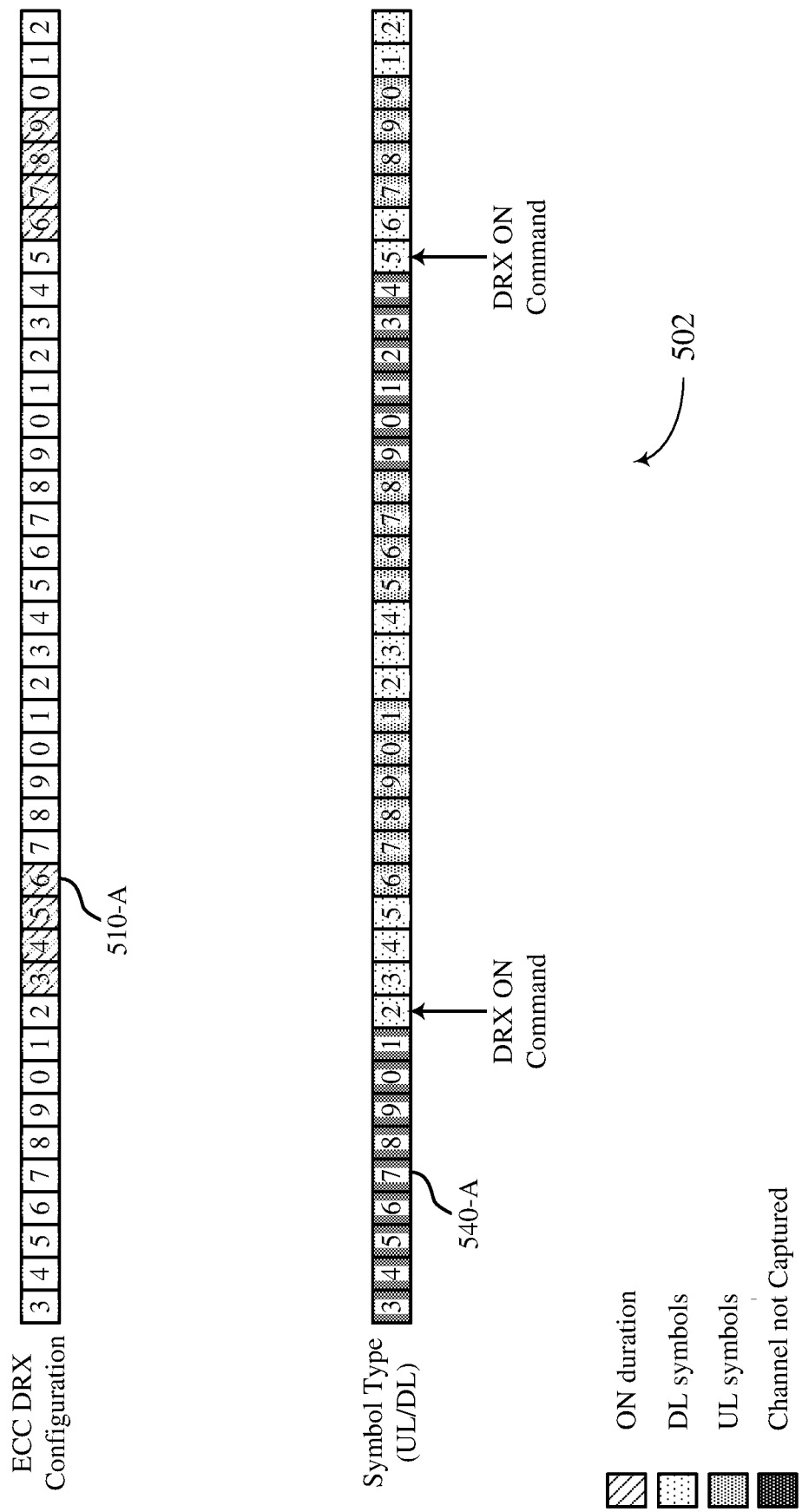

FIGS. 5A and 5B illustrate examples timing diagrams 501 and 502 for systems that support DRX procedures with eCCs in accordance with various aspects of the present disclosure. For instance, wireless communications systems 100 and 200 of FIGS. 1 and 2 may support communication according to timing diagrams 501 and 502. Timing diagrams 501 and 502 represent eCC DRX configurations for communication over shared or unlicensed spectrum using listen-before-talk (LBT) operations. Timing diagrams 501 and 502 may include symbols 505 which may include features of symbols 405 of FIGS. 4A, 4B and 4C, ON duration symbols 510 which may include features of ON duration symbols 410, UL symbols 520 which may include features of UL symbols 420, DL symbols 525 which may include features of DL symbols 425, and additional ON duration symbols 535 which may include features of additional ON duration symbols 435 as described herein with reference to FIGS. 4A, 4B and 4C.

In some cases, a UE 115 or base station 105 may operate in a shared or unlicensed frequency spectrum. These devices may perform a CCA prior to communicating in order to determine whether the channel is available. A CCA may include an energy detection procedure to determine whether there are any other active transmissions. For example, the device may infer that a change in a received signal strength indication (RSSI) of a power meter indicates that a channel is occupied. Specifically, signal power that is concentrated in a certain bandwidth and exceeds a predetermined noise floor may indicate the presence of another wireless transmitter. A CCA may also include detection of a pre-determined or randomly selected sequence with features that indicate use of the channel. For example, another device may transmit a specific preamble prior to transmitting a data sequence. In some cases, a CCA may be a part of a listen-before-talk (LBT) configuration.

In shared or unlicensed spectrum operation, a base station 105 may not be able to capture the channel during a DRX ON state to schedule the UE 115. The base station 105 may need to follow certain LBT procedures, such as a CCA or enhanced CCA (eCCA), to determine whether the channel is available. It may be preferable for the UE 115 to be in a DRX ON state when the channel is available, however, the UE 115 may not know when the base station 105 has successfully captured the channel when it wakes up. In some cases, the base station 105 may configure an additional timer, such as a channel acquisition timer, so that the UE 115 may remain awake long enough to determine whether the channel is captured. If the channel is not captured, the UE 115 may return to a DRX sleep state.

According to the example of FIG. 5A, a base station 105 may configure multiple timers, such as multiple eCC DRX timers. For example, the base station 105 may configure a first timer which may be used to detect whether the base station 105 has captured the channel. A second timer may be used for ensuring a sufficiently long DRX ON duration if the channel is available. In some cases, if the UE 115 detects that the base station 105 has acquired a channel during the first timer (e.g., by receiving a channel acquisition indication), the second timer may be started. The UL/DL symbol type portion of timing diagram 501 may include an uncaptured channel period 540 during which the base station 105 does not have the channel. For example, the uncaptured channel period 540 may include symbols during which the serving base station 105 failed a CCA or eCCA, or symbols before a CCA or eCCA was successful.

In some cases, the UE 115 make wake up during ON duration symbols 510 and start the first timer. For example, the UE 115 may awake during uncaptured channel period 540. The base station 105 may have a clear channel and may transmit a DL burst 525. The UE 115 may detect that the channel is clear prior to the expiration of the channel expiration timer and the second timer may be initiated. The combination of the first and second timers may result in additional ON duration symbols 535 being added to the ON duration symbols 510 based on the duration of the second timer. The additional ON duration symbols 535 may allow the UE 115 to detect the beginning and/or end of a burst, such as UL burst 520 or DL burst 525. If the UE 115 does not detect a clear channel during the first timer (corresponding to ON duration symbols 510), the UE 115 may return to sleep. That is, the second timer may not be started and additional ON duration symbols 535 may not be added to the ON duration symbols 510.

According to the example of FIG. 5B, an explicit DRX ON command may be used to activate a UE 115 when a base station 105 has captured a channel and is ready to communicate. That is, during a period when the channel is not captured (uncaptured channel period 540-a), the base station 105 may perform a CCA and then indicate that the channel is captured to the UE 115. In some examples, the command may be transmitted via a primary cell (PCell). The UE 115 may wake-up, or start ON duration symbols 510-a, based on reception of the DRX ON command. In some cases when a DRX ON command is used, eCC DRX operation may be asynchronous. That is, it may not be based on a DRX cycle. For example, the UE 115 may not wake for ON duration symbols 510-a without reception of a command.

Figure 6:
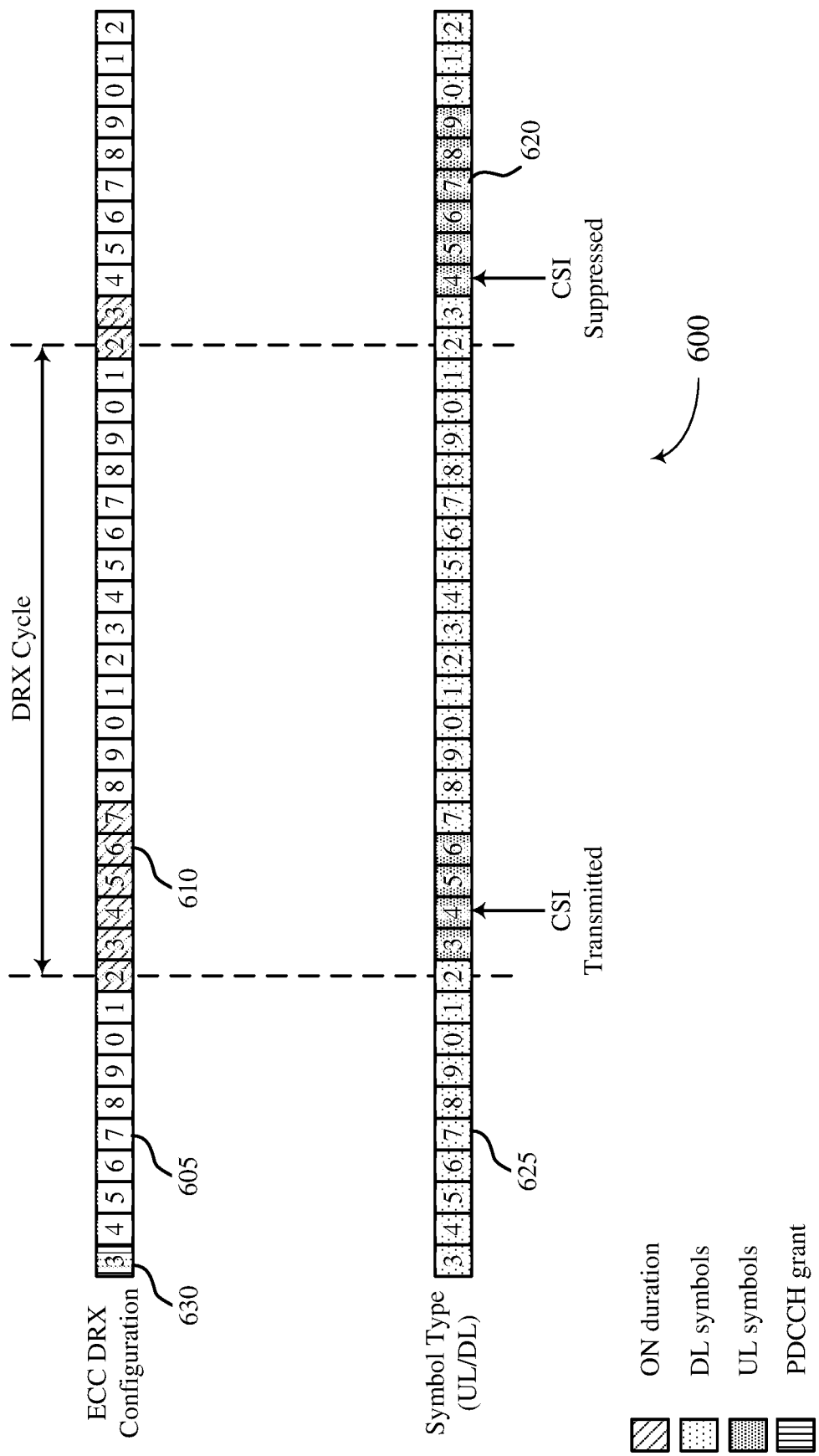

FIG. 6 illustrates an example of a timing diagram 600 for systems that support DRX procedures with eCCs in accordance with various aspects of the present disclosure. For instance, wireless communications systems 100 and 200 of FIGS. 1 and 2 may support communication according to timing diagram 600. Timing diagram 600 may illustrate an example of when a UE 115 may transmit channel state information (CSI) during eCC DRX operation. Timing diagram 600 may include symbols 605, ON duration symbols 610, UL symbols 620, DL symbols 625, and grant symbol 630 which may include features of corresponding symbols of FIGS. 3-5.

A base station 105 may gather channel condition information from a UE 115 in order to efficiently configure and/or schedule the channel. This information may be sent from the UE 115 in the form of a channel state report. A channel state report may contain a rank indicator (RI) requesting a number of layers to be used for DL transmissions (e.g., based on the antenna ports of the UE 115), a precoding matrix indicator (PMI) indicating a preference for which precoder matrix should be used (based on the number of layers), and a channel quality indicator (CQI) representing the highest modulation and coding scheme (MCS) that may be used. CQI may be calculated by a UE 115 after receiving predetermined pilot symbols such as cell-specific reference signals (CRS) or CSI reference signal. RI and PMI may be excluded if the UE 115 does not support spatial multiplexing (or is not in a mode that supports spatial multiplexing). The types of information included in the report determines a reporting type. Channel state reports may be periodic or aperiodic. That is, an base station 105 may configure a UE 115 to send periodic reports at regular intervals, and may also request additional reports as needed. Aperiodic reports may include wideband reports indicating the channel quality across an entire cell bandwidth, UE 115 selected reports indicating a subset of the preferred subbands, or configured reports in which the subbands reported are selected by the base station 105.

A UE 115 may not transmit CSI unless it is awake during an UL burst. Thus, to allow CSI transmission when using DRX, an base station 105 may configure DRX so that an UL burst 620 occurs while the UE 115 is awake, such as during a DRX ON state. For example, CSI transmission may be suppressed unless ON duration symbols 610 overlap with, or contain, an UL burst 620. It should be noted that the ON duration symbols 610 may fully contain the UL burst 620, or may overlap with a subset of the UL burst 620. In some cases, UL symbols 620 do not increment the DRX timers. That is, a UE 115 may suspend an eCC DRX timer during UL symbols 620 and resume the eCC DRX timer during the first symbol period of the next set of DL symbols 625.

Figure 7:
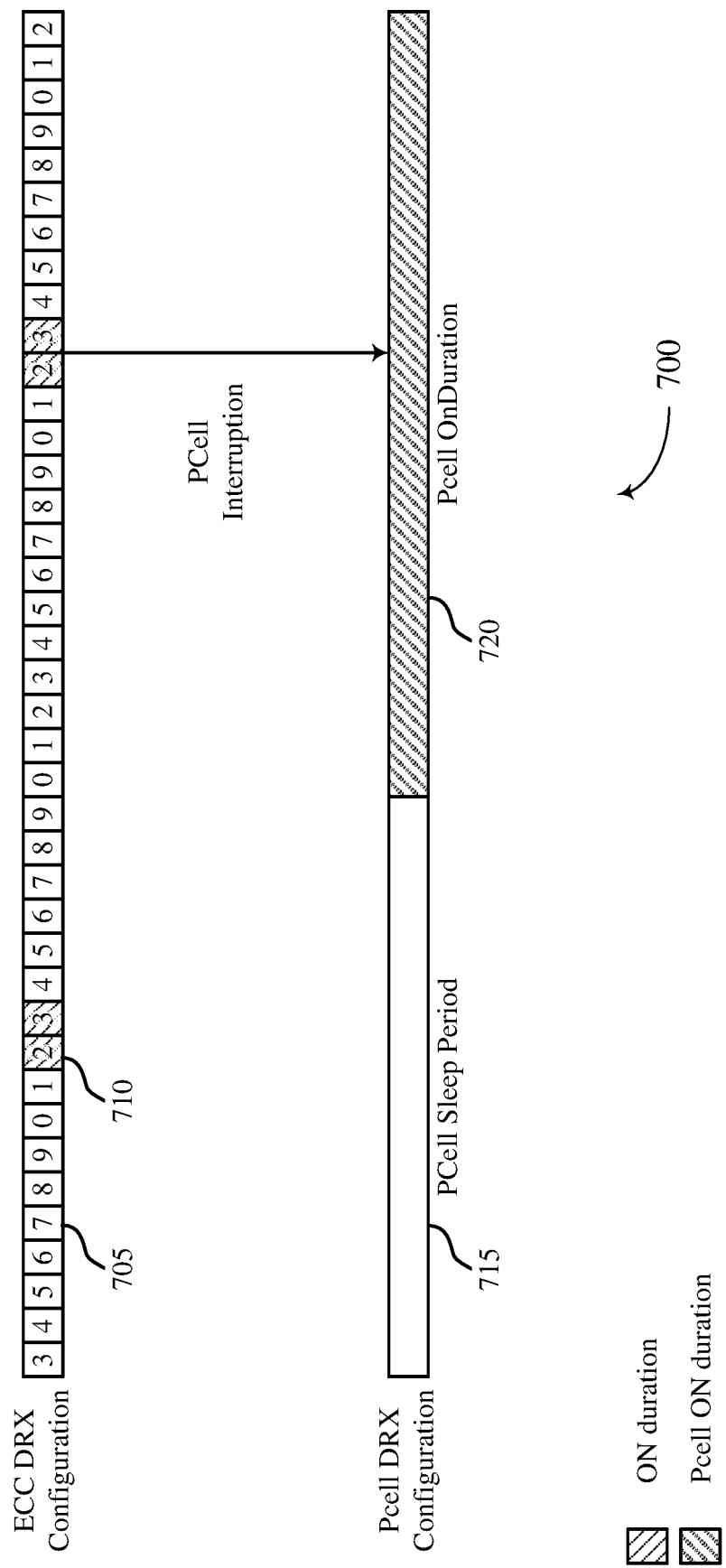

FIG. 7 illustrates an example of a timing diagram 700 in systems that support DRX procedures with eCCs in accordance with various aspects of the present disclosure. For instance, wireless communications systems 100 and 200 of FIGS. 1 and 2 may support communication according to timing diagram 700. Timing diagram 700 may represent an eCC DRX configuration for mitigating interference with a PCell. Timing diagram 700 may include symbols 705 and ON duration symbols 710 which may include features described herein with reference to FIGS. 3-6. Timing diagram 700 may also include PCell sleep period 715 and PCell ON duration 720.

In some cases, a different DRX configuration for an eCC and a PCell may result in an interruption in communication with the PCell. The interruption of the PCell may be caused by DRX transitions from on periods to off periods, or vice versa, on an eCC SCell. This may result in loss of data symbols on the PCell (e.g., a loss of 1 TTI for inter-band or 5 TTIs for intra-band communications). Thus, frequent DRX transitions on an eCC may cause a large number of interruptions on the PCell.

To avoid PCell interruptions, the eCC DRX cycle may only apply during PCell sleep periods 715, while during other periods, such as PCell ON duration 720, the DRX cycle of the UE 115 may be coordinated with the PCell DRX configuration. Additionally or alternatively, an eCC capable UE 115 may indicate support for symbol-level interruption on the PCell (e.g., via RRC messaging). In some cases, the interruption caused by a few symbols may not compromise the entire PCell TTI. Thus, rather than limiting eCC DRX to PCell sleep periods 715, PCell transmissions may be rate-matched around interrupted symbols.

Figure 8:
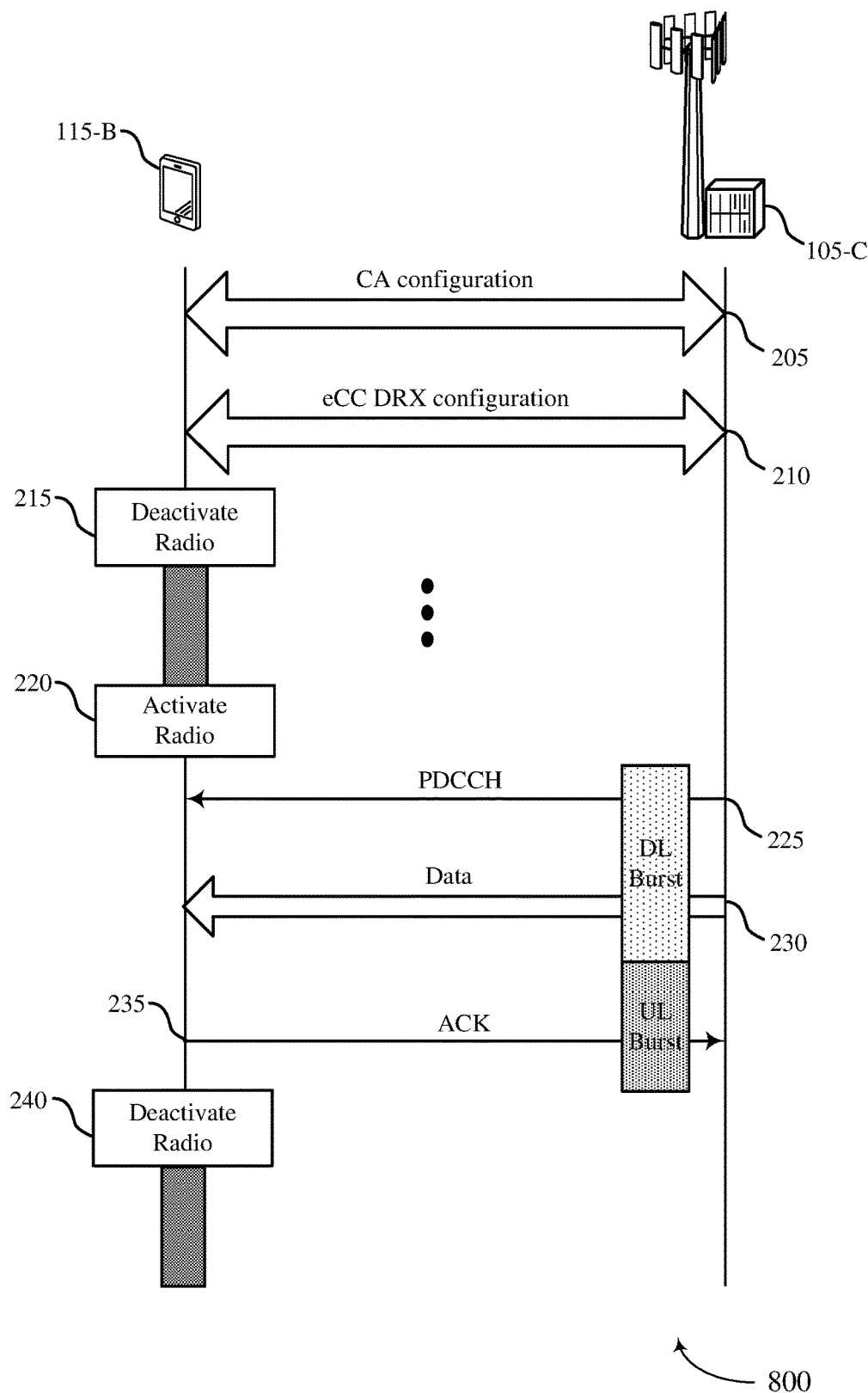
FIG. 8 illustrates an example of a process flow in a system that supports DRX procedures with eCCs in accordance with various aspects of the present disclosure.

FIG. 8 illustrates an example of a process flow 800 within a system that supports DRX procedures with eCCs in accordance with various aspects of the present disclosure. Process flow 800 may include communications between a UE 115-b and a base station 105-c, which may be examples of a UE 115 and base station 105 described herein with reference to FIGS. 1-2.

At 205, UE 115-b and base station 105-c may establish a carrier aggregation (CA) configuration. Each device may determine the configuration including a first component carrier with a first channel usage procedure and a second component carrier with a second channel usage procedure; the first channel usage procedure may be different from the second channel usage procedure. In some examples, the first channel usage procedure is based on monitoring or transmitting using a first TTI length and the second channel usage procedure is based on monitoring or transmitting using a second TTI length different than the first TTI length. The first TTI length may, for example, be an LTE subframe and the second TTI length may be an LTE symbol period. In some examples, the second component carrier is in a shared or unlicensed spectrum. In some examples, the second channel usage procedure is based at least in part on an LBT procedure and the first channel usage procedure is based at least in part on a non-LBT procedure. In some examples, the first component carrier is a PCell and the second component carrier is an eCC SCell.

In some cases, the second channel usage procedure may be based on a CCA procedure and the first channel usage procedure may not be based on a CCA procedure. Thus, UE 115-b may monitor whether a channel has been acquired by base station 105-c during the channel acquisition timer and manage the DRX configuration based on the monitoring. In some cases, UE 115-b may receive a DRX initiation message and initiate a DRX ON duration according to the second configuration based at least in part on the DRX initiation message. The DRX initiation message may be transmitted by base station 105-c based at least in part on a CCA for the second carrier. UE 115-b may receive a DRX command message for the second carrier on the first component carrier and transition to a DRX OFF state on the second component carrier based at least in part on the DRX command message.

At 210, UE 115-b and base station 105-c may establish a DRX configuration. Each device may determine a DRX configuration including a first configuration for the first component carrier and a second configuration for the second component carrier. In some cases, (e.g., if UE 115-b and base station 105-c are communicating using unlicensed spectrum) the second configuration is based on a channel acquisition timer. Thus, base station 105-c may configure UE 115-b with the CA configuration and the DRX configuration. In some examples, the DRX configuration includes one or more DRX modes, and each mode may correspond to a relation between the first configuration and the second configuration. A DRX mode may specify that the first configuration is independent of the second configuration. In some examples, a mode of the one or more DRX modes includes a DRX ON duration of the second configuration associated with at least one DRX ON duration of the first configuration. In some examples, a DRX mode may specify that the first configuration is independent of the second configuration during OFF durations of the first configuration and that a DRX ON duration of the second configuration associated with each DRX ON duration of the first configuration.

In some examples, the first configuration may be based on one DRX timer and the second configuration may be based on a different DRX timer. In some examples, the second configuration includes a DL TTI associated with each ON duration of the second configuration. Additionally or alternatively, the DL TTI associated with each ON duration of the second configuration may be configured with DL control information directed toward the UE 115. In some cases, a DL burst configuration of the second component carrier includes a final DL TTI for each DL burst that occurs during an ON duration of the second configuration. Each ON duration of the second configuration may be extended to include a final DL TTI for a DL burst of the second component carrier. In some examples, the second configuration includes a first set of ON durations co-extensive with a set of ON durations of the first configuration and a second set of ON durations within at least one OFF duration of the first configuration.

At 215, UE 115-b may deactivate a radio (or a radio component) based on the DRX configuration for the eCC. For example, UE 115-b may deactivate at least one radio component for communication on the second component carrier according to the second configuration.

At 220, UE 115-b may activate the radio (or radio component) based on the DRX configuration for the eCC. UE 115-b may activate the at least one radio component for an ON duration according to the second configuration. In some cases, (e.g., if UE 115-b and base station 105-c are communicating using unlicensed spectrum) UE 115-b may receive a DRX initiation message from base station 105-c on the first component carrier based on a CCA for the second component carrier. Then UE 115-b may initiate a DRX ON duration according to the second configuration (i.e., for the eCC) based on the DRX initiation message. In some cases, the activation of the radio may interfere with communication on a PCell and base station 105-c may rate match a data transmission on the first component carrier based on symbol level interruption of the first component carrier associated with an ON duration associated with the second configuration.

The UE may detect the CCA without an explicit DRX initiation message in the first carrier, e.g., by monitoring a reference signal on the second carrier during the channel acquisition timer. The UE may initiate a DRX ON operation according to the second configuration based on the CCA detection. The UE may receive, for the second carrier, a DRX command message from the base station. The DRX command message may be sent on the first carrier. The UE may transition to a DRX OFF state on the second carrier based on the DRX command message, regardless of the DRX configuration on the first carrier.

At 225, UE 115-b may receive a control message (such as a PDCCH or ePDCCH) from base station 105-c during an eCC DL burst. Thus, UE 115-b may receive a control channel message on the second component carrier during the ON duration. In some cases, UE 115-b may receive an indication of a DL burst length from base station 105-c during the ON duration. In some examples, UE 115-b may receive an indication of a scheduled UL burst during the final DL TTI of an ON duration of the second configuration.

At 230, UE 115-b may receive data from base station 105-c based on a grant in the control message during the eCC DL burst. At 235, UE 115-b may transmit an UL to base station 105-c during a subsequent UL burst. In some cases, UE 115-b may transmit an ACK for a HARQ process associated with the second component carrier based on the indication. In some examples the second configuration includes an UL burst within an ON duration. In some cases, UE 115-b may transmit a CSI message using a TTI of the UL burst. At 240, UE 115-b may deactivate the radio (or radio component) for the next DRX sleep period.

Figure 9:
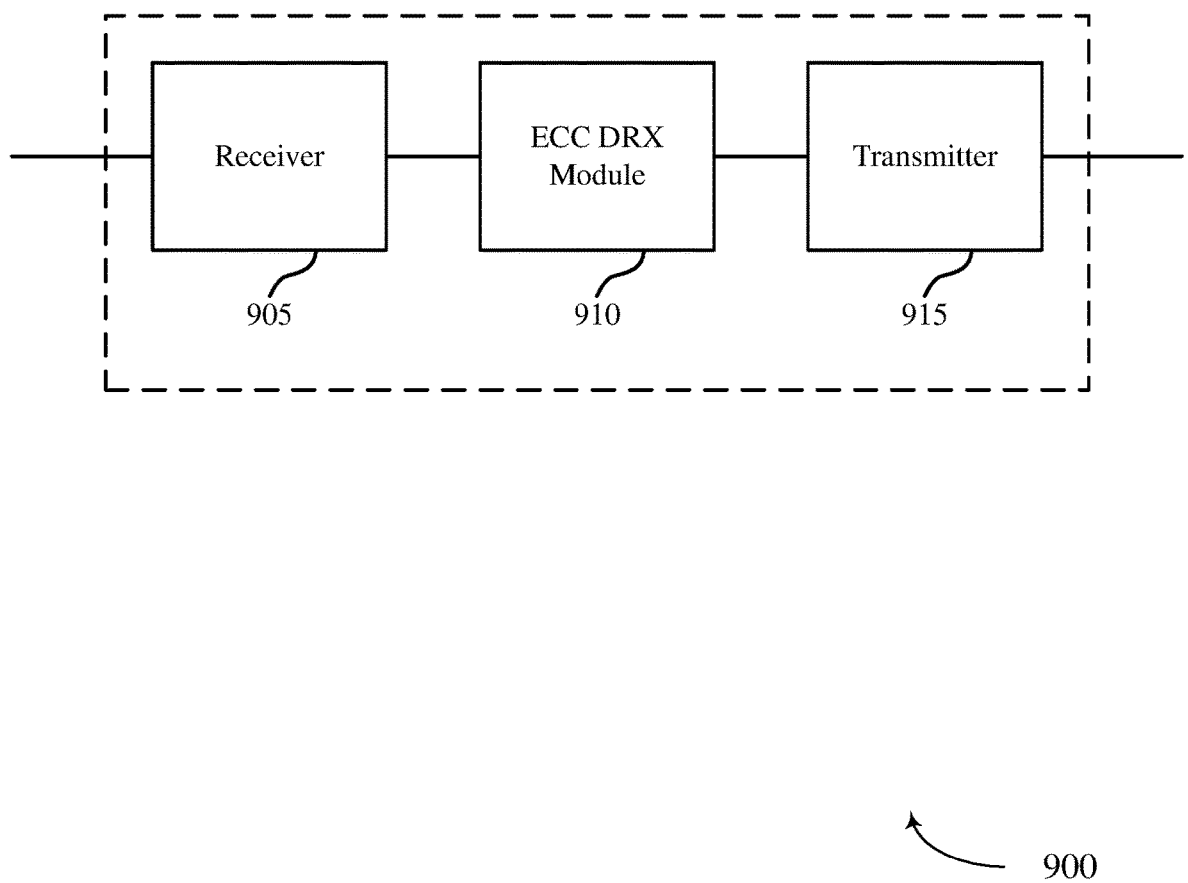
FIGS. 9-11 show block diagrams of a wireless device that supports DRX procedures with eCCs in accordance with various aspects of the present disclosure.

Next, FIG. 9 shows a block diagram of a wireless device 900 configured for DRX procedures with eCCs in accordance with various aspects of the present disclosure. Wireless device 900 may be an example of aspects of a UE 115 or base station 105 described with reference to FIGS. 1-8. Wireless device 900 may include a receiver 905, an eCC DRX module 910, or a transmitter 915. Wireless device 900 may also include a processor. Each of these components may be in communication with one another.

The receiver 905 may receive information such as packets, user data, or control information associated with various information channels (e.g., control channels, data channels, and information related to DRX procedures with eCCs, etc.). Information may be passed on to the eCC DRX module 910, and to other components of wireless device 900. For example, the receiver 905 may receive a DRX initiation message on the first component carrier based on a CCA for the second component carrier. In some examples, the receiver 905 may receive a control channel message on the second component carrier during the ON duration. In some case, the receiver 905 may receive an indication of a DL burst length during the ON duration. Additionally or alternatively, the receiver 905 may receive an indication of a scheduled UL burst during the final DL TTI of an ON duration of the second configuration.

The eCC DRX module 910 may determine a CA configuration, which may include a first component carrier with a first channel usage procedure and a second component carrier with a second channel usage procedure. The first channel usage procedure may be different from the second channel usage procedure. The eCC DRX module 910 may also determine a DRX configuration, which may include a first configuration for the first component carrier and a second configuration for the second component carrier.

The transmitter 915 may transmit signals received from other components of wireless device 900. In some examples, the transmitter 915 may be collocated with the receiver 905 in a transceiver module. The transmitter 915 may include a single antenna, or it may include a plurality of antennas. In some examples, the transmitter 915 may transmit an indication of a DL burst length during an ON duration of the second configuration.

Figure 10:
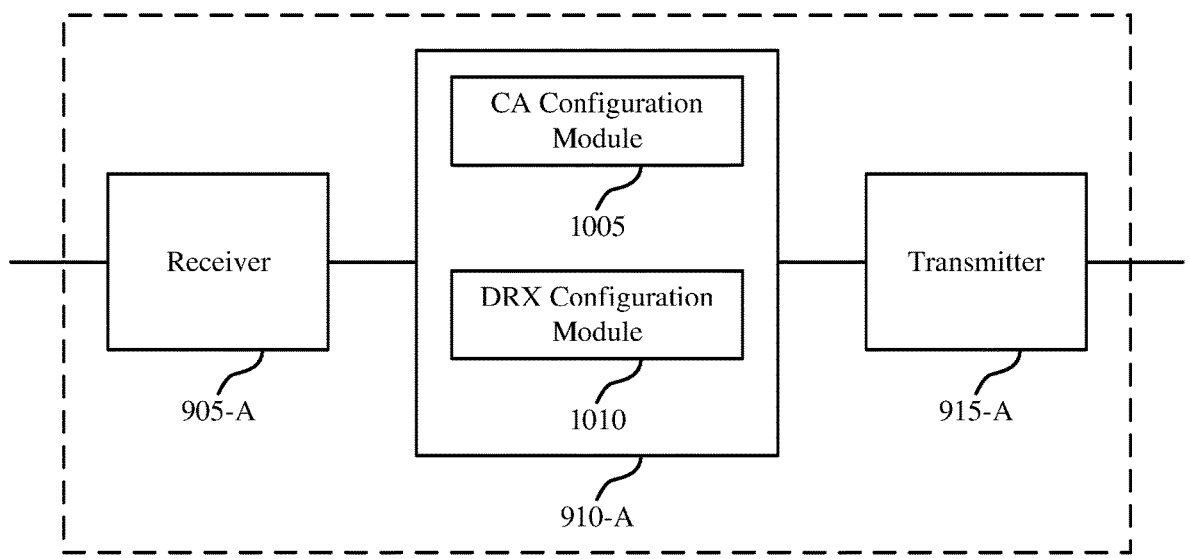

FIG. 10 shows a block diagram of a wireless device 1000 for DRX procedures with eCCs in accordance with various aspects of the present disclosure. Wireless device 1000 may be an example of aspects of a wireless device 900 or a UE 115 or base station 105 described with reference to FIGS. 1-9. Wireless device 1000 may include a receiver 905-a, an eCC DRX module 910-a, or a transmitter 915-a. Wireless device 1000 may also include a processor. Each of these components may be in communication with one another. The eCC DRX module 910-a may also include a CA configuration module 1005, and a DRX configuration module 1010.

The receiver 905-a may receive information which may be passed on to eCC DRX module 910-a, and to other components of wireless device 1000. The eCC DRX module 910-a may perform the operations described herein with reference to FIG. 9. The transmitter 915-a may transmit signals received from other components of wireless device 1000.

The CA configuration module 1005 may determine a CA configuration including a first component carrier with a first channel usage procedure and a second component carrier with a second channel usage procedure as described herein with reference to FIGS. 2-8. The first channel usage procedure may be different from the second channel usage procedure. The CA configuration module 1005 may also configure a wireless device with the CA configuration and the DRX configuration. In some examples, the first component carrier may be a PCell and the second component carrier may be an eCC secondary cell (SCell).

The DRX configuration module 1010 may determine a DRX configuration including a first configuration for the first component carrier and a second configuration for the second component carrier as described herein with reference to FIGS. 2-8. In some examples, the DRX configuration includes one or several DRX modes, such that each mode may correspond to a relation between the first configuration and the second configuration. In some examples, a DRX mode specifies that the first configuration may be independent of the second configuration. In some examples, a DRX mode includes a DRX ON duration of the second configuration associated with a DRX ON duration of the first configuration. In some examples, a DRX mode may specify that the first configuration is independent of the second configuration during OFF durations of the first configuration and that a DRX ON duration of the second configuration associated with each DRX ON duration of the first configuration.

The first configuration described herein may be based on one DRX timer and the second configuration may be based on a different DRX timer. In some examples, the second configuration includes a DL TTI associated with each ON duration of the second configuration. In some examples, the DL TTI associated with each ON duration of the second configuration may be configured with DL control information directed toward the UE 115. In some cases, a DL burst configuration of the second component carrier may include a final DL TTI for each DL burst that occurs during an ON duration of the second configuration. Each ON duration of the second configuration may be extended to include a final DL TTI for a DL burst of the second component carrier. In some examples, the second configuration includes an UL burst within an ON duration. The second configuration may include a first set of ON durations co-extensive with a set of ON durations of the first configuration and a second set of ON durations within at least one OFF duration of the first configuration.

Figure 11:
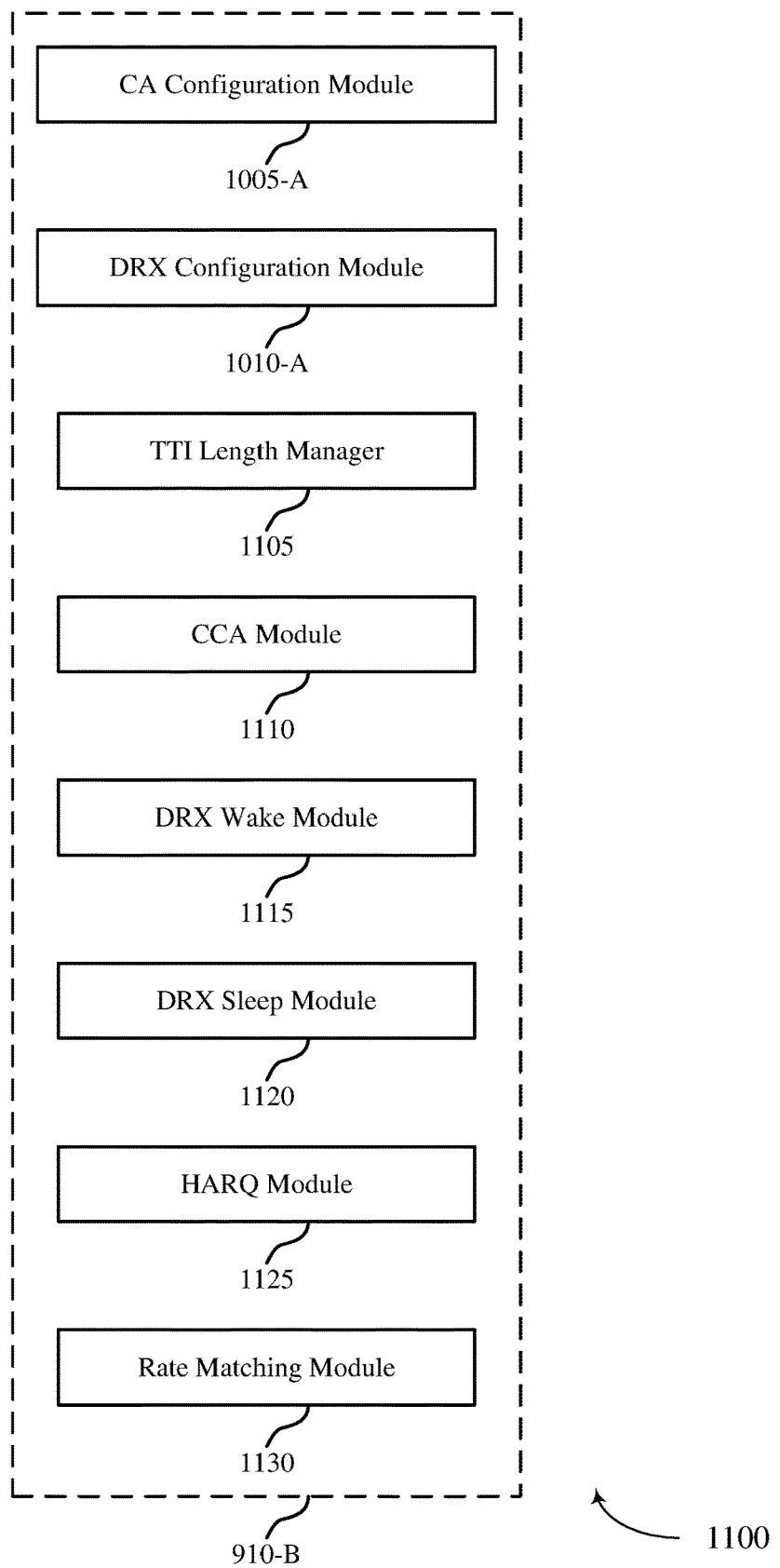

FIG. 11 shows a block diagram 1100 of an eCC DRX module 910-b which may be a component of a wireless device 900 or a wireless device 1000 for DRX procedures with eCCs in accordance with various aspects of the present disclosure. The eCC DRX module 910-b may be an example of aspects of an eCC DRX module 910 described with reference to FIGS. 9-10. The eCC DRX module 910-b may include a CA configuration module 1005-a, and a DRX configuration module 1010-a. Each of these modules may perform the functions described herein with reference to FIG. 10. The eCC DRX module 910-b may also include a TTI length manager 1105, a CCA module 1110, a DRX wake module 1115, a DRX sleep module 1120, a HARQ module 1125, and a rate matching module 1130.

The TTI length manager 1105 may configure or be configured to determine a first channel usage procedure based on monitoring or transmitting using a first transmission TTI length and a second channel usage procedure based on monitoring or transmitting using a second TTI length different than the first TTI length, as described herein with reference to FIGS. 2-8. In some examples, the first TTI length may be an LTE subframe and the second TTI length may be an LTE symbol period.

The CCA module 1110 may configure or be configured to determine a second channel usage procedure based on a CCA procedure and a first channel usage procedure not based on a CCA procedure, as described herein with reference to FIGS. 2-8. In some examples, the second component carrier may be in a shared or unlicensed spectrum. In some examples, the second configuration may be based on a channel acquisition timer. The DRX wake module 1115 may initiate a DRX ON duration according to the second configuration based on the DRX initiation message as described herein with reference to FIGS. 2-8. The DRX wake module 1115 may also activate the at least one radio component for an ON duration according to the second configuration.

The DRX sleep module 1120 may deactivate at least one radio component for communication on the second component carrier according to the second configuration as described herein with reference to FIGS. 2-8. The HARQ module 1125 may transmit an ACK for a HARQ process associated with the second component carrier based on the indication as described herein with reference to FIGS. 2-8. The rate matching module 1130 may rate match a data transmission on the first component carrier based on symbol level interruption of the first component carrier associated with an ON duration associated with the second configuration as described herein with reference to FIGS. 2-8.

Figure 12:
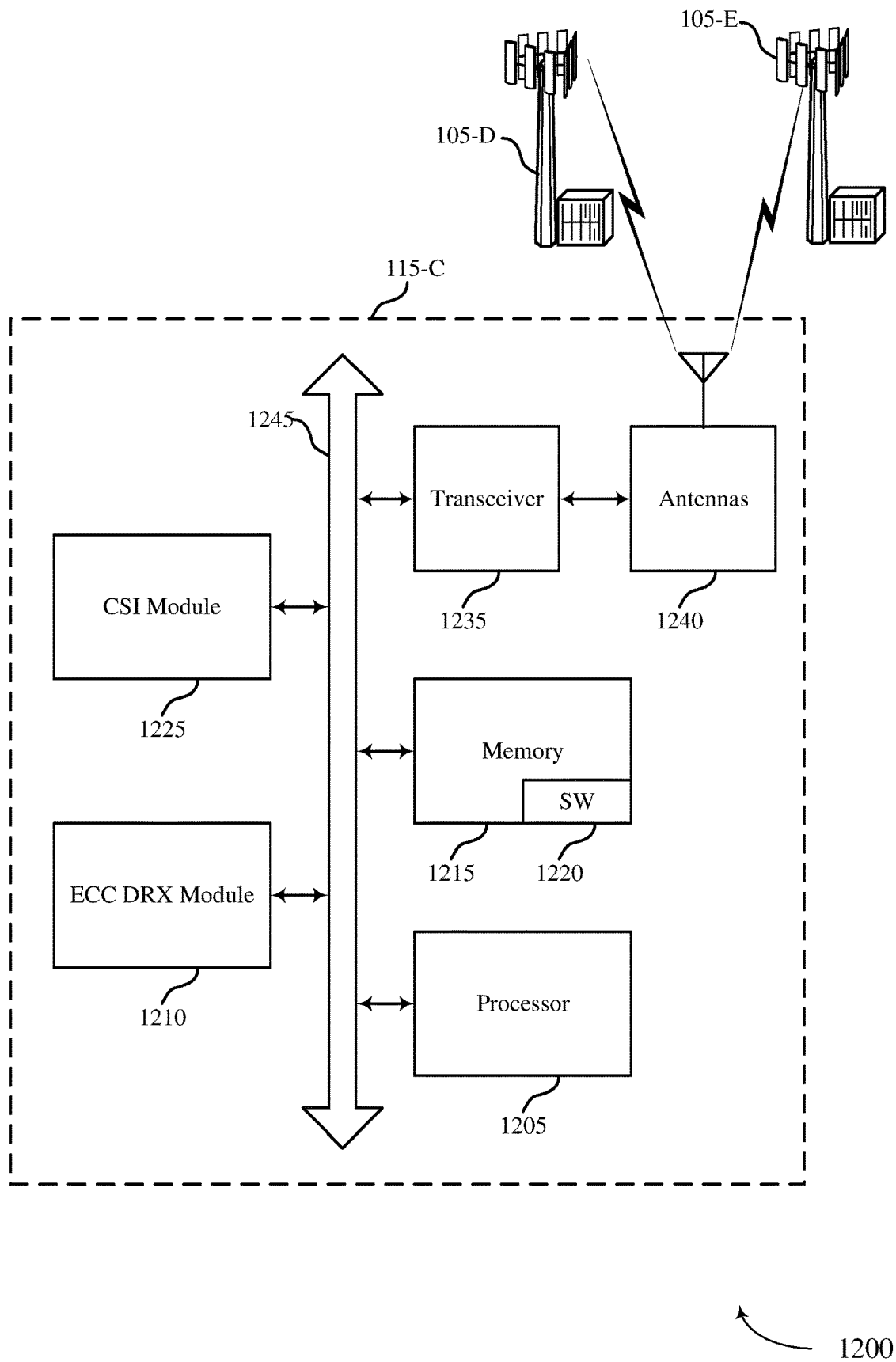
FIG. 12 illustrates a diagram of a system including a UE that supports DRX procedures with eCCs in accordance with various aspects of the present disclosure.

FIG. 12 shows a diagram of a system 1200 including a UE 115 configured for DRX procedures with eCCs in accordance with various aspects of the present disclosure. System 1200 may include UE 115-c, which may be an example of a wireless device 900, a wireless device 1000, or a UE 115 described herein with reference to FIGS. 1, 2, and 9-11. UE 115-c may include an eCC DRX module 1210, which may be an example of an eCC DRX module 910 described with reference to FIGS. 9-11. UE 115-c may also include a CSI module 1225. UE 115-c may also include components for bi-directional voice and data communications including components for transmitting communications and components for receiving communications. For example, UE 115-c may communicate bi-directionally with base station 105-d or base station 105-e, which may support different component carriers of a carrier aggregation configuration. The CSI module 1225 may transmit a CSI message using a TTI of the UL burst as described herein with reference to FIGS. 2-8.

UE 115-c may also include a processor 1205, and memory 1215 (including software (SW) 1220), a transceiver 1235, and one or more antenna(s) 1240, each of which may communicate, directly or indirectly, with one another (e.g., via buses 1245). The transceiver 1235 may communicate bi-directionally, via the antenna(s) 1240 or wired or wireless links, with one or more networks, as described above. For example, the transceiver 1235 may communicate bi-directionally with a base station 105 or another UE 115. The transceiver 1235 may include a modem to modulate the packets and provide the modulated packets to the antenna(s) 1240 for transmission, and to demodulate packets received from the antenna(s) 1240. While UE 115-c may include a single antenna 1240, UE 115-c may also have multiple antennas 1240 capable of concurrently transmitting or receiving multiple wireless transmissions.

The memory 1215 may include random access memory (RAM) and read only memory (ROM). The memory 1215 may store computer-readable, computer-executable software/firmware code 1220 including instructions that, when executed, cause the processor 1205 to perform various functions described herein (e.g., DRX procedures with eCCs, etc.). Alternatively, the software/firmware code 1220 may not be directly executable by the processor 1205 but cause a computer (e.g., when compiled and executed) to perform functions described herein. The processor 1205 may include an intelligent hardware device, (e.g., a central processing unit (CPU), a microcontroller, an ASIC, etc.).

Figure 13:
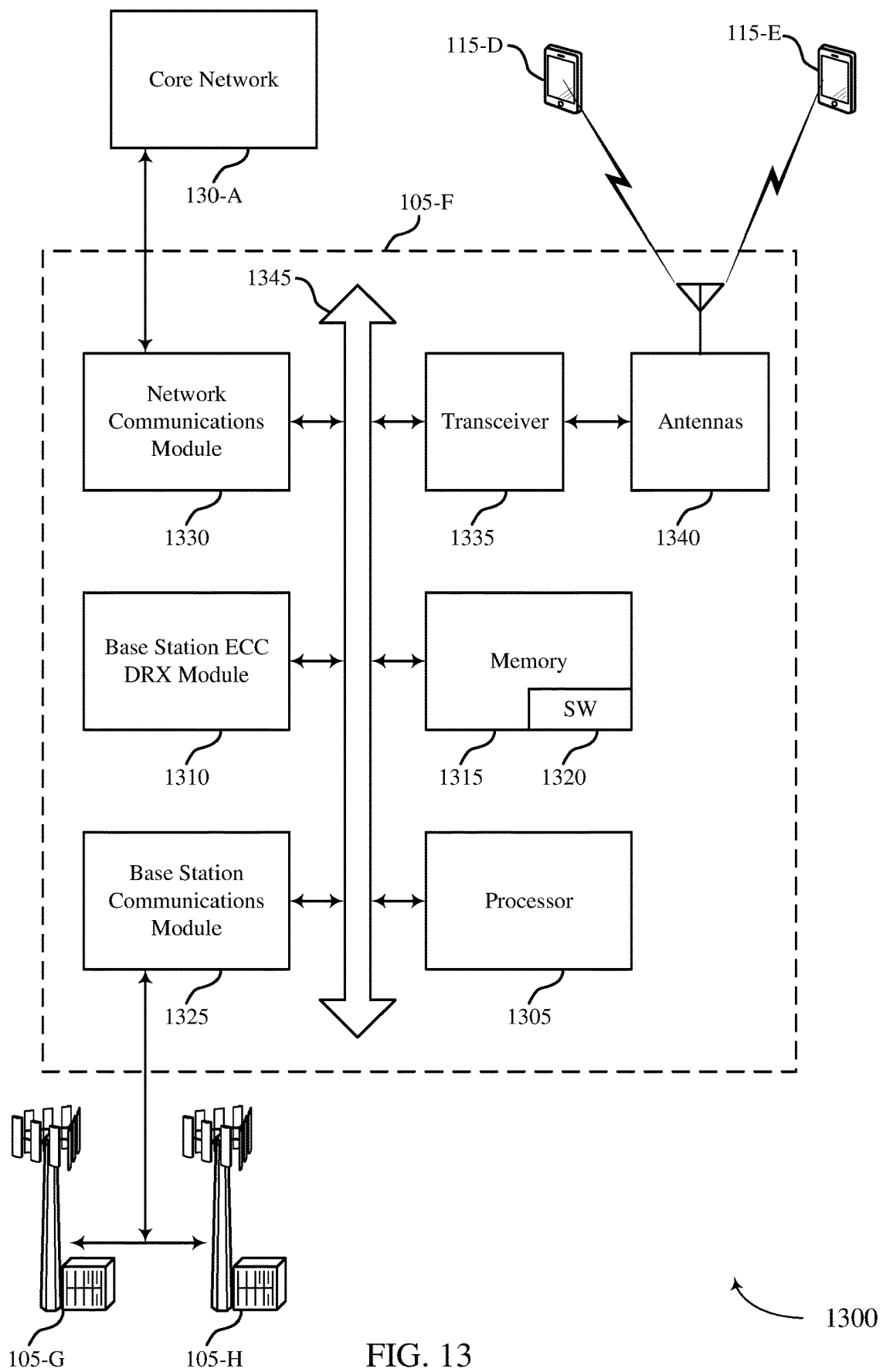
FIG. 13 illustrates a diagram of a system including a base station that supports DRX procedures with eCCs in accordance with various aspects of the present disclosure.

FIG. 13 shows a diagram of a system 1300 including a base station 105 configured for DRX procedures with eCCs in accordance with various aspects of the present disclosure. System 1300 may include base station 105-f, which may be an example of a wireless device 900, a wireless device 1000, or a base station 105 described herein with reference to FIGS. 1, 2, and 10-12. Base station 105-f may include a base station eCC DRX module 1310, which may be an example of a base station eCC DRX module 1310 described with reference to FIGS. 10-12. Base station 105-f may also include components for bi-directional voice and data communications including components for transmitting communications and components for receiving communications. For example, base station 105-f may communicate bi-directionally with UE 115-d or UE 115-e.

In some cases, base station 105-f may have one or more wired backhaul links. Base station 105-f may have a wired backhaul link (e.g., S1 interface, etc.) to the core network 130. Base station 105-f may also communicate with other base stations 105, such as base station 105-g and base station 105-h via inter-base station backhaul links (e.g., an X2 interface). Each of the base stations 105 may communicate with UEs 115 using the same or different wireless communications technologies. In some cases, base station 105-f may communicate with other base stations such as 105-g or 105-h utilizing base station communications module 1325. In some examples, base station communications module 1325 may provide an X2 interface within an LTE/LTE-A wireless communication network technology to provide communication between some of the base stations 105. In some examples, base station 105-f may communicate with other base stations through core network 130. In some cases, base station 105-f may communicate with the core network 130 through network communications module 1330.

The base station 105-f may include a processor 1305, memory 1315 (including software (SW) 1320), transceiver 1335, and antenna(s) 1340, which each may be in communication, directly or indirectly, with one another (e.g., over bus system 1345). The transceivers 1335 may be configured to communicate bi-directionally, via the antenna(s) 1340, with the UEs 115, which may be multi-mode devices. The transceiver 1335 (or other components of the base station 105-f) may also be configured to communicate bi-directionally, via the antennas 1340, with one or more other base stations (not shown). The transceiver 1335 may include a modem configured to modulate the packets and provide the modulated packets to the antennas 1340 for transmission, and to demodulate packets received from the antennas 1340. The base station 105-f may include multiple transceivers 1335, each with one or more associated antennas 1340. The transceiver may be an example of a combined receiver 905 and transmitter 915 of FIG. 9.

The memory 1315 may include RAM and ROM. The memory 1315 may also store computer-readable, computer-executable software code 1320 containing instructions that are configured to, when executed, cause the processor 1305 to perform various functions described herein (e.g., DRX procedures with eCCs, selecting coverage enhancement techniques, call processing, database management, message routing, etc.). Alternatively, the software 1320 may not be directly executable by the processor 1305 but be configured to cause the computer (e.g., when compiled and executed) to perform functions described herein. The processor 1305 may include an intelligent hardware device (e.g., a CPU, a microcontroller, an ASIC, etc.). The processor 1305 may include various special purpose processors such as encoders, queue processing modules, base band processors, radio head controllers, digital signal processor (DSPs), and the like.

The base station communications module 1325 may manage communications with other base stations 105. The base station communications module 1325 may include a controller or scheduler for controlling communications with UEs 115 in cooperation with other base stations 105. For example, the base station communications module 1325 may coordinate scheduling for transmissions to UEs 115 for various interference mitigation techniques such as beamforming or joint transmission.

The components of wireless device 900, wireless device 1000, eCC DRX module 910, system 1200 and system 1300 may, individually or collectively, be implemented with at least one ASIC adapted to perform some or all of the applicable functions in hardware. Alternatively, the functions may be performed by one or more other processing units (or cores), on at least one IC. In other examples, other types of integrated circuits may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

Figure 14:
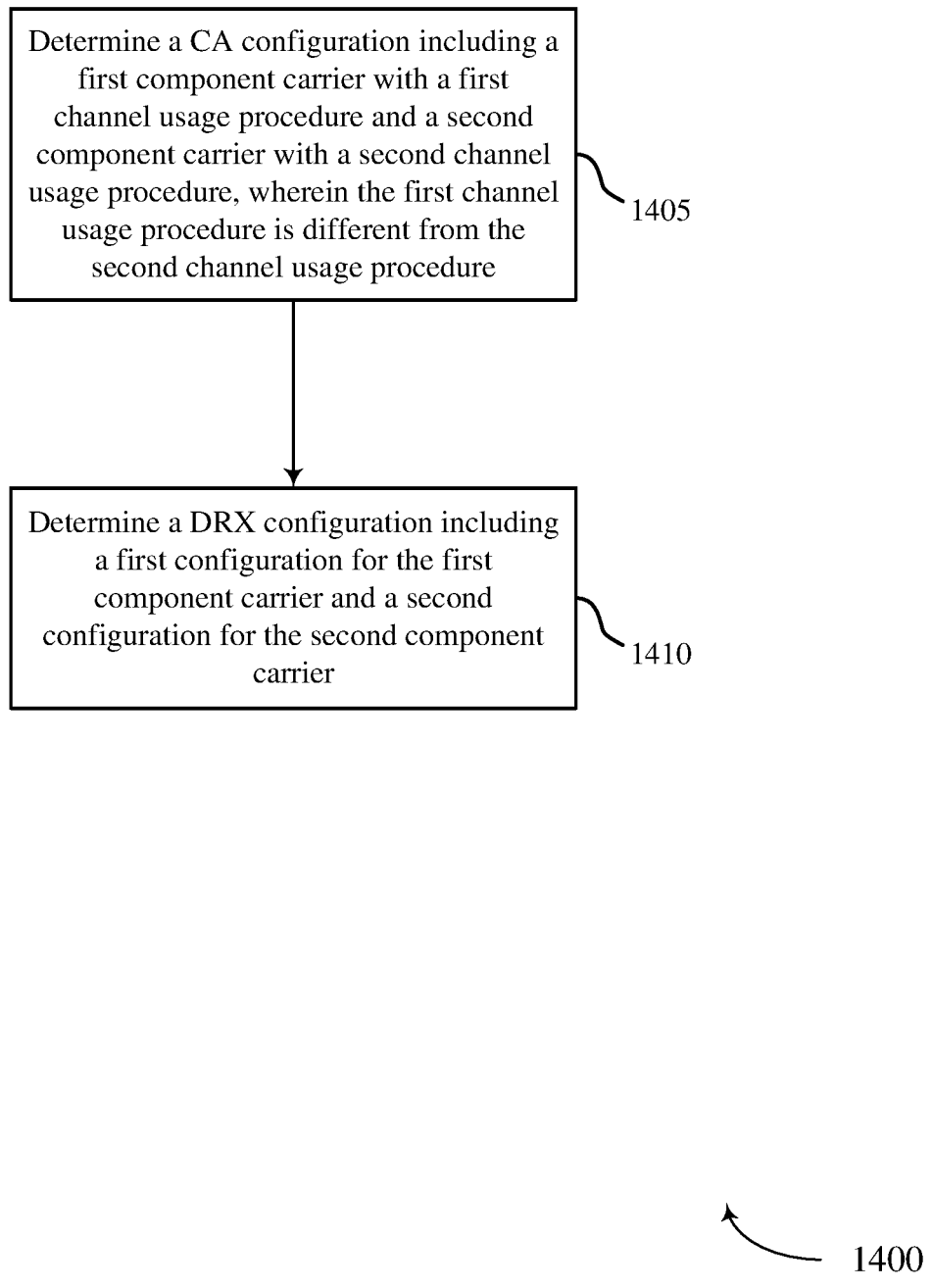
FIGS. 14-19 illustrate methods for DRX procedures with eCCs in accordance with various aspects of the present disclosure.

FIG. 14 illustrates a method 1400 for DRX procedures with eCCs in accordance with various aspects of the present disclosure. The operations of method 1400 may be implemented by a UE 115 or base station 105 or its components as described with reference to FIGS. 1-13. For example, the operations of method 1400 may be performed by the eCC DRX module 910 as described with reference to FIGS. 9-12. In some examples, a device may execute a set of codes to control the functional elements of the device to perform the functions described below. Additionally or alternatively, the device may perform aspects the functions described below using special-purpose hardware.

At block 1405, the device may determine a CA configuration including a first component carrier with a first channel usage procedure and a second component carrier with a second channel usage procedure, and the first channel usage procedure may be different from the second channel usage procedure as described herein with reference to FIGS. 2-8. In certain examples, the operations of block 1405 may be performed by the CA configuration module 1005 as described herein with reference to FIG. 10.

At block 1410, the device may determine a DRX configuration including a first configuration for the first component carrier and a second configuration for the second component carrier as described herein with reference to FIGS. 2-8. In certain examples, the operations of block 1410 may be performed by the DRX configuration module 1010 as described herein with reference to FIG. 10.

Figure 15:
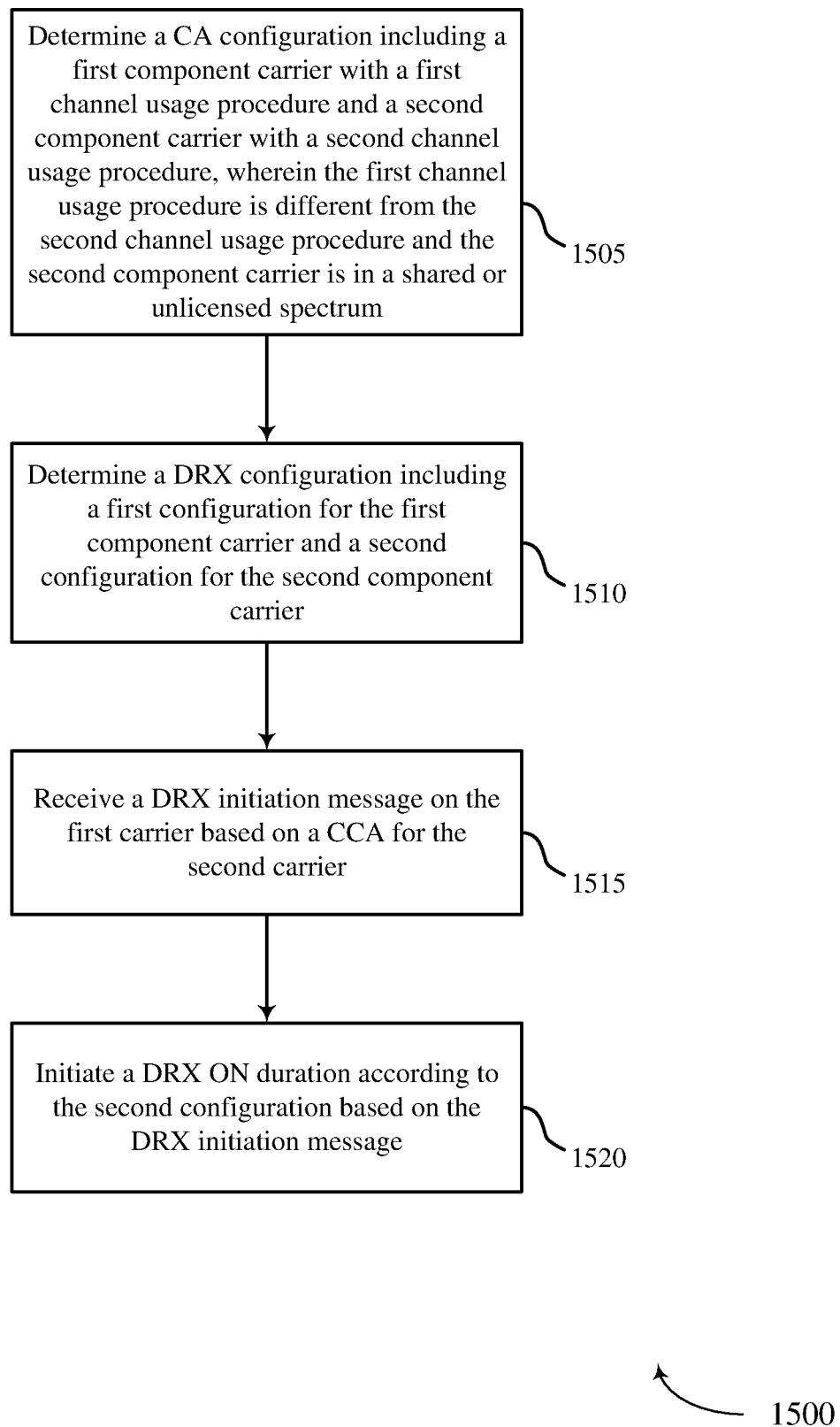

FIG. 15 illustrates a method 1500 for DRX procedures with eCCs in accordance with various aspects of the present disclosure. The operations of method 1500 may be implemented by a UE 115 or base station 105 or its components as described with reference to FIGS. 1-13. For example, the operations of method 1500 may be performed by the eCC DRX module 910 as described with reference to FIGS. 9-12. In some examples, a device may execute a set of codes to control the functional elements of the device to perform the functions described below. Additionally or alternatively, the device may perform aspects the functions described below using special-purpose hardware. The method 1500 may also incorporate aspects of method 1400 of FIG. 14.

At block 1505, the device may determine a CA configuration including a first component carrier with a first channel usage procedure and a second component carrier with a second channel usage procedure, and the first channel usage procedure may be different from the second channel usage procedure as described herein with reference to FIGS. 2-8. In some cases, the second component carrier is in a shared or unlicensed spectrum. In certain examples, the operations of block 1505 may be performed by the CA configuration module 1005 as described herein with reference to FIG. 10.

At block 1510, the device may determine a DRX configuration including a first configuration for the first component carrier and a second configuration for the second component carrier as described herein with reference to FIGS. 2-8. In certain examples, the operations of block 1510 may be performed by the DRX configuration module 1010 as described herein with reference to FIG. 10. At block 1515, the device may receive a DRX initiation message on the first component carrier based on a CCA for the second component carrier as described herein with reference to FIGS. 2-8. In certain examples, the operations of block 1515 may be performed by the receiver 905 as described herein with reference to FIG. 9. At block 1520, the device may initiate a DRX ON duration according to the second configuration based on the DRX initiation message as described herein with reference to FIGS. 2-8. In certain examples, the operations of block 1520 may be performed by the DRX wake module 1115 as described herein with reference to FIG. 11.

Figure 16:
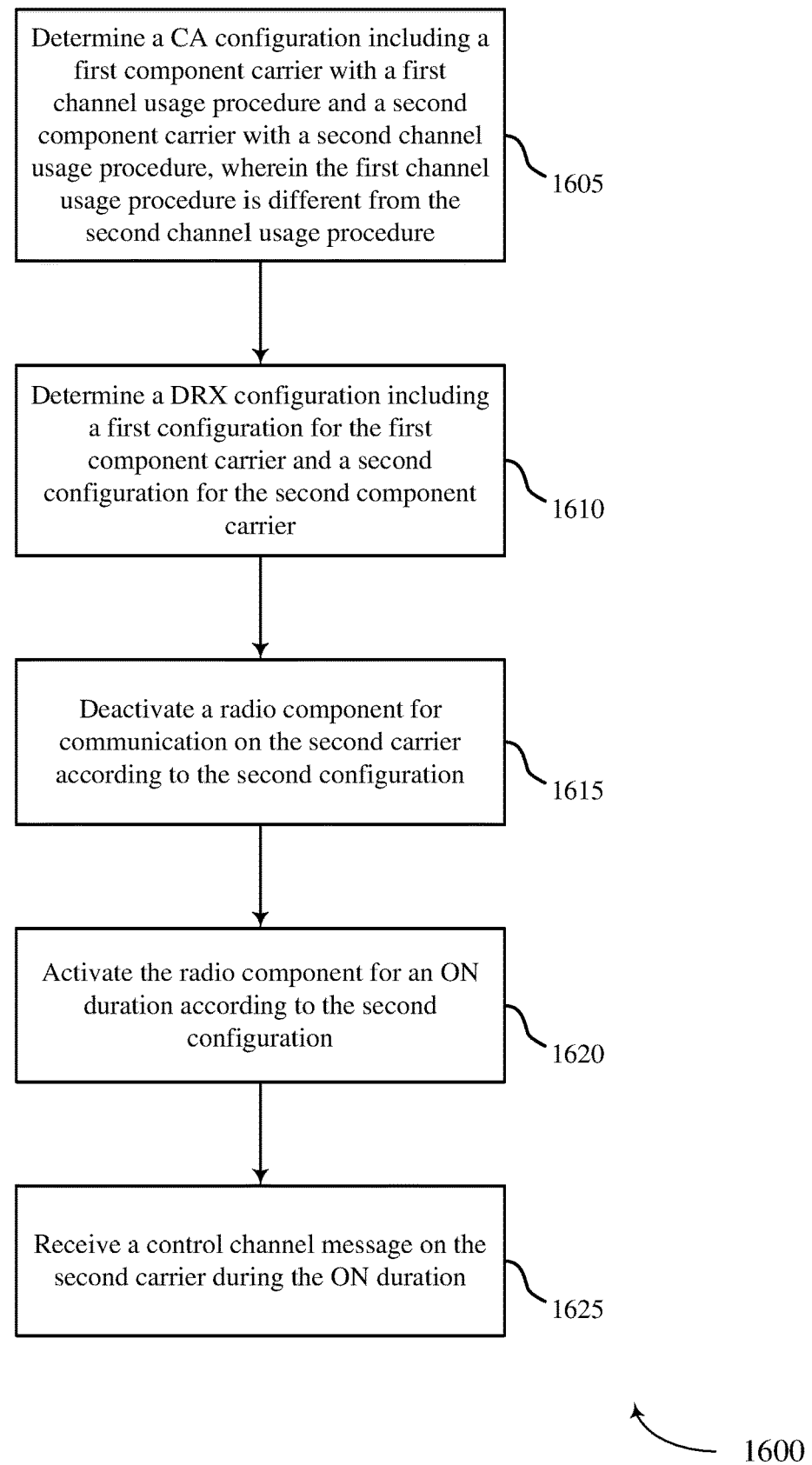

FIG. 16 illustrates a method 1600 for DRX procedures with eCCs in accordance with various aspects of the present disclosure. The operations of method 1600 may be implemented by a UE 115 or base station 105 or its components as described with reference to FIGS. 1-13. For example, the operations of method 1600 may be performed by the eCC DRX module 910 as described with reference to FIGS. 9-12. In some examples, a device may execute a set of codes to control the functional elements of the device to perform the functions described below. Additionally or alternatively, the device may perform aspects the functions described below using special-purpose hardware. The method 1600 may also incorporate aspects of methods 1400, and 1500 of FIGS. 14-15.

At block 1605, the device may determine a CA configuration including a first component carrier with a first channel usage procedure and a second component carrier with a second channel usage procedure, and the first channel usage procedure may be different from the second channel usage procedure as described herein with reference to FIGS. 2-8. In certain examples, the operations of block 1605 may be performed by the CA configuration module 1005 as described herein with reference to FIG. 10. At block 1610, the device may determine a DRX configuration including a first configuration for the first component carrier and a second configuration for the second component carrier as described herein with reference to FIGS. 2-8. In certain examples, the operations of block 1610 may be performed by the DRX configuration module 1010 as described herein with reference to FIG. 10.

At block 1615, the device may deactivate at least one radio component for communication on the second component carrier according to the second configuration as described herein with reference to FIGS. 2-8. In certain examples, the operations of block 1615 may be performed by the DRX sleep module 1120 as described herein with reference to FIG. 11. At block 1620, the device may activate the at least one radio component for an ON duration according to the second configuration as described herein with reference to FIGS. 2-8. In certain examples, the operations of block 1620 may be performed by the DRX wake module 1115 as described herein with reference to FIG. 11. At block 1625, the device may receive a control channel message on the second component carrier during the ON duration as described herein with reference to FIGS. 2-8. In certain examples, the operations of block 1625 may be performed by the receiver 905 as described herein with reference to FIG. 9.

Figure 17:
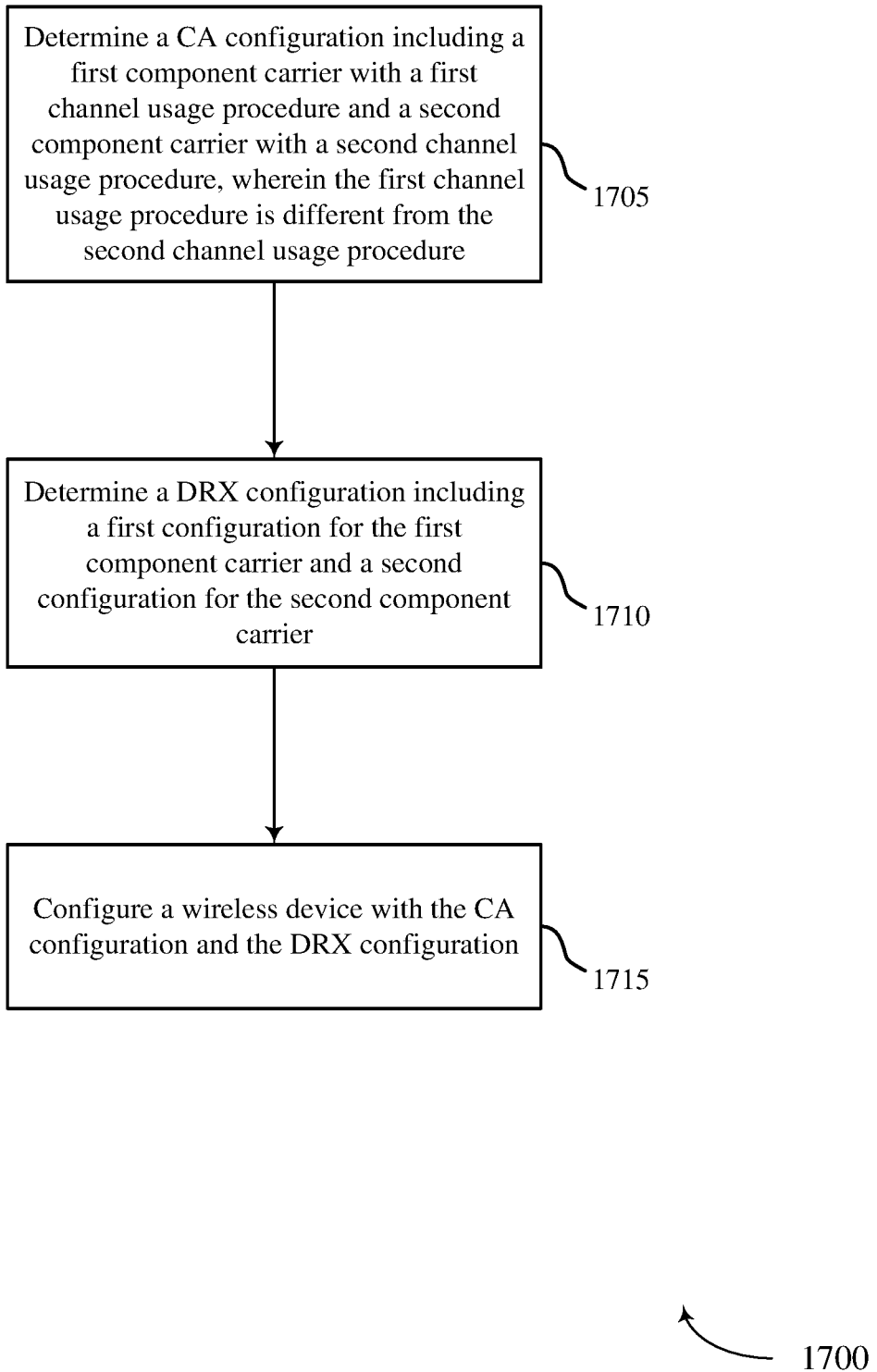

FIG. 17 illustrates a method 1700 for DRX procedures with eCCs in accordance with various aspects of the present disclosure. The operations of method 1700 may be implemented by a base station 105 or its components as described with reference to FIGS. 1-13. For example, the operations of method 1700 may be performed by the eCC DRX module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1700 may also incorporate aspects of methods 1400, 1500, and 1600 of FIGS. 14-16.

At block 1705, the base station 105 may determine a CA configuration including a first component carrier with a first channel usage procedure and a second component carrier with a second channel usage procedure, and the first channel usage procedure may be different from the second channel usage procedure as described herein with reference to FIGS. 2-8. In certain examples, the operations of block 1705 may be performed by the CA configuration module 1005 as described herein with reference to FIG. 10. At block 1710, the base station 105 may determine a DRX configuration including a first configuration for the first component carrier and a second configuration for the second component carrier as described herein with reference to FIGS. 2-8. In certain examples, the operations of block 1710 may be performed by the DRX configuration module 1010 as described herein with reference to FIG. 10. At block 1715, the base station 105 may configure a wireless device with the CA configuration and the DRX configuration as described herein with reference to FIGS. 2-8. In certain examples, the operations of block 1715 may be performed by the CA configuration module 1005 as described herein with reference to FIG. 10.

Figure 18:
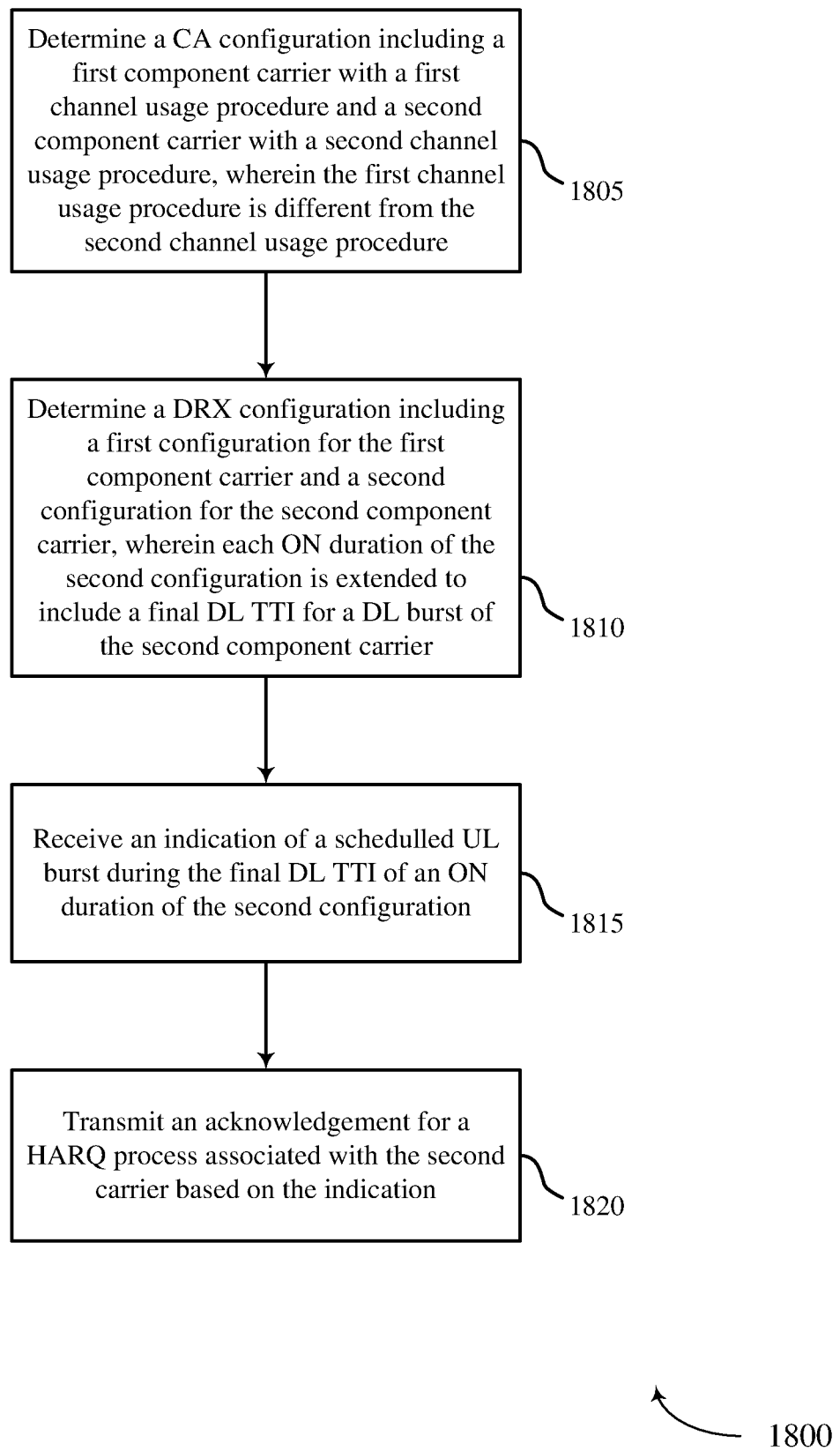

FIG. 18 illustrates a method 1800 for DRX procedures with eCCs in accordance with various aspects of the present disclosure. The operations of method 1800 may be implemented by a UE 115 or base station 105 or its components as described with reference to FIGS. 1-13. For example, the operations of method 1800 may be performed by the eCC DRX module 910 as described with reference to FIGS. 9-12. In some examples, a device may execute a set of codes to control the functional elements of the device to perform the functions described below. Additionally or alternatively, the device may perform aspects the functions described below using special-purpose hardware. The method 1800 may also incorporate aspects of methods 1400, 1500, 1600, and 1700 of FIGS. 14-17.

At block 1805, the device may determine a CA configuration including a first component carrier with a first channel usage procedure and a second component carrier with a second channel usage procedure, and the first channel usage procedure may be different from the second channel usage procedure as described herein with reference to FIGS. 2-8. In certain examples, the operations of block 1805 may be performed by the CA configuration module 1005 as described herein with reference to FIG. 10. At block 1810, the device may determine a DRX configuration including a first configuration for the first component carrier and a second configuration for the second component carrier as described herein with reference to FIGS. 2-8. In some cases, each ON duration of the second configuration is extended to include a final DL TTI for a DL burst of the second component carrier. In certain examples, the operations of block 1810 may be performed by the DRX configuration module 1010 as described herein with reference to FIG. 10.

At block 1815, the device may receive an indication of a scheduled UL burst during the final DL TTI of an ON duration of the second configuration as described herein with reference to FIGS. 2-8. In certain examples, the operations of block 1815 may be performed by the receiver 905 as described herein with reference to FIG. 9. At block 1820, the device may transmit an ACK for a HARQ process associated with the second component carrier based on the indication as described herein with reference to FIGS. 2-8. In certain examples, the operations of block 1820 may be performed by the HARQ module 1125 as described herein with reference to FIG. 11.

Figure 19:
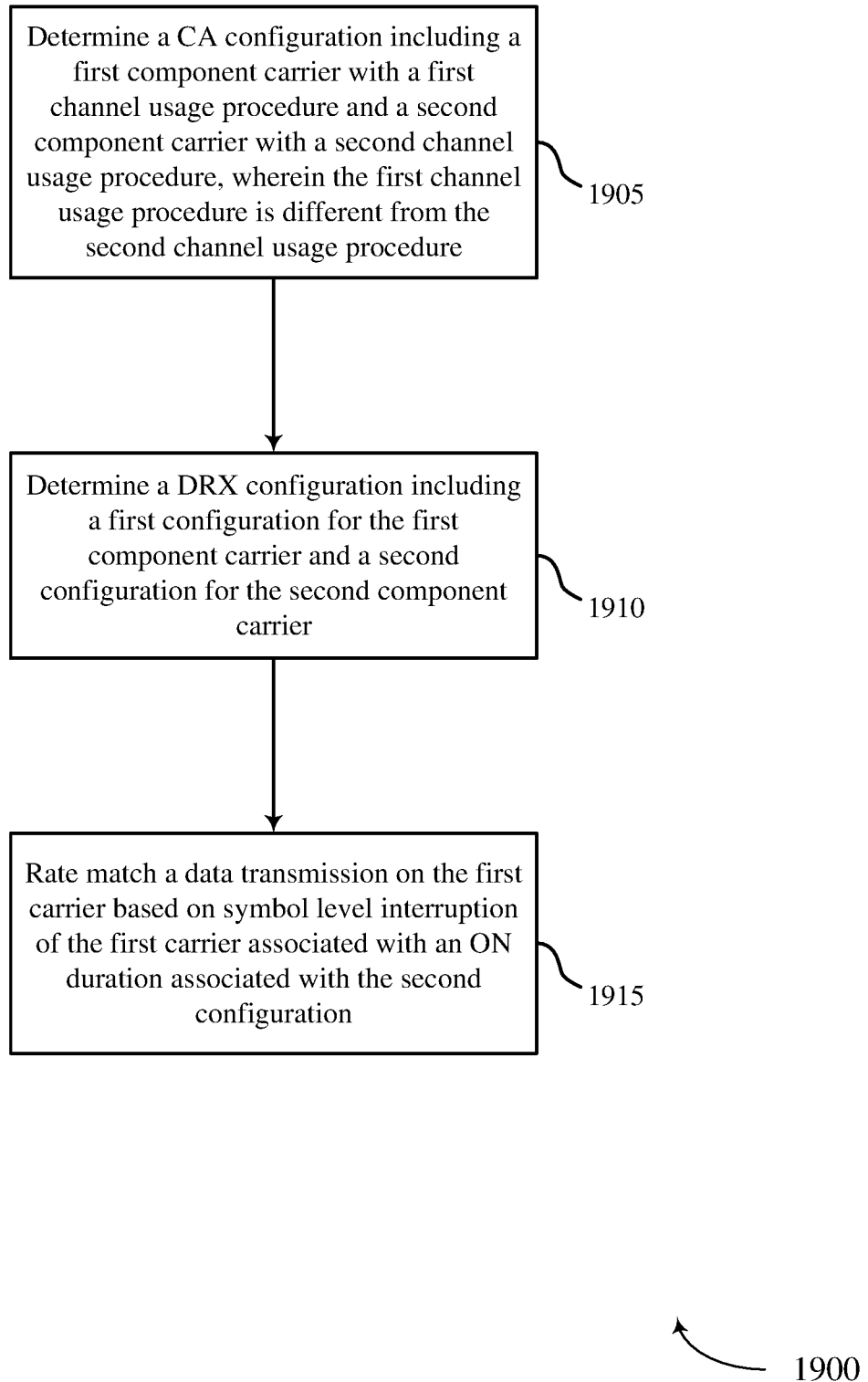

FIG. 19 illustrates a method 1900 for DRX procedures with eCCs in accordance with various aspects of the present disclosure. The operations of method 1900 may be implemented by a base station 105 or its components as described with reference to FIGS. 1-13. For example, the operations of method 1900 may be performed by the eCC DRX module 910 as described with reference to FIGS. 9-12. In some examples, a base station 105 may execute a set of codes to control the functional elements of the base station 105 to perform the functions described below. Additionally or alternatively, the base station 105 may perform aspects the functions described below using special-purpose hardware. The method 1900 may also incorporate aspects of methods 1400, 1500, 1600, 1700, and 1800 of FIGS. 14-18.

At block 1905, the base station 105 may determine a CA configuration including a first component carrier with a first channel usage procedure and a second component carrier with a second channel usage procedure, and the first channel usage procedure may be different from the second channel usage procedure as described herein with reference to FIGS. 2-8. In certain examples, the operations of block 1905 may be performed by the CA configuration module 1005 as described herein with reference to FIG. 10. At block 1910, the base station 105 may determine a DRX configuration including a first configuration for the first component carrier and a second configuration for the second component carrier as described herein with reference to FIGS. 2-8. In certain examples, the operations of block 1910 may be performed by the DRX configuration module 1010 as described herein with reference to FIG. 10. At block 1915, the base station 105 may rate match a data transmission on the first component carrier based on symbol level interruption of the first component carrier associated with an ON duration associated with the second configuration as described herein with reference to FIGS. 2-8. In certain examples, the operations of block 1915 may be performed by the rate matching module 1130 as described herein with reference to FIG. 11.

Thus, methods 1400, 1500, 1600, 1700, 1800, and 1900 may provide for DRX procedures with eCCs. It should be noted that methods 1400, 1500, 1600, 1700, 1800, and 1900 describe possible implementation, and that the operations and the steps may be rearranged or otherwise modified such that other implementations are possible. In some examples, aspects from two or more of the methods 1400, 1500, 1600, 1700, 1800, and 1900 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, UMTS, LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the uplink transmissions may also be called reverse link transmissions. Each communication link described herein—including, for example, wireless communications systems 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of wireless communication, comprising:
   determining a carrier aggregation (CA) configuration comprising a first component carrier with a first subcarrier spacing (SCS) and a second component carrier with a second SCS different than the first SCS;
   performing discontinuous reception (DRX) on the first component carrier based on a first DRX timer duration, the first DRX timer duration being based at least in part on the first SCS; and
   performing DRX on the second component carrier based on a second DRX timer duration, the second DRX timer duration being based at least in part on the second SCS, the first DRX timer duration being different than the second DRX timer duration.

2. The method of claim 1 further comprising:
   receiving a DRX initiation message; and
   wherein the performing DRX on the second component carrier comprises initiating a DRX ON duration according to a second configuration corresponding to the second SCS based at least in part on the DRX initiation message.

3. The method of claim 2, further comprising:
   receiving a DRX command message for the second component carrier on the first component carrier; and
   transitioning to a DRX OFF state on the second component carrier based at least in part on the DRX command message.

4. The method of claim 1, wherein the performing DRX on the second component carrier comprises deactivating at least one radio component for communication on the second component carrier for a first period of time according to a second configuration corresponding to the second SCS; and further comprising:
   activating the at least one radio component for an ON duration after the first period of time has elapsed; and receiving a control channel message on the second component carrier during the ON duration, wherein the control channel message indicates a burst length during the ON duration.

5. The method of claim 1, wherein a second configuration corresponding to the second SCS comprises a DL SCS associated with each ON duration of the second configuration.

6. The method of claim 5, wherein the DL SCS associated with each ON duration of the second configuration is configured with DL control information directed toward a user equipment.

7. An apparatus for wireless communication, comprising:
means for determining a carrier aggregation (CA) configuration comprising a first component carrier with a first subcarrier spacing (SCS) and a second component carrier with a second SCS different than the first SCS;
means for performing discontinuous reception (DRX) on the first component carrier based on a first DRX timer duration, the first DRX timer duration being based at least in part on the first SCS; and
means for performing discontinuous reception (DRX) on the second component carrier based on a second DRX timer duration, the second DRX timer duration being based at least in part on the second SCS, the first DRX timer duration being different than the second DRX timer duration.

8. The apparatus of claim 7, further comprising:
means for receiving a DRX initiation message; and
wherein the means for performing DRX on the second component carrier initiates a DRX ON duration according to a second configuration corresponding to the second SCS based at least in part on the DRX initiation message.

9. The apparatus of claim 8, further comprising:
means for receiving a DRX command message for the second component carrier on the first component carrier; and
means for transitioning to a DRX OFF state on the second component carrier based at least in part on the DRX command message.

10. The apparatus of claim 7, wherein the means for performing DRX on the second component carrier deactivates at least one radio component for communication on the second component carrier for a first period of time according to a second configuration corresponding to the second SCS; and further comprising:
means for activating the at least one radio component for an ON duration after the first period of time has elapsed; and
means for receiving a control channel message on the second component carrier during the ON duration, wherein the control channel message indicates a burst length during the ON duration.

11. The apparatus of claim 7, wherein a second configuration corresponding to the second SCS comprises a DL SCS associated with each ON duration of the second configuration.

12. The apparatus of claim 11, wherein the DL SCS associated with each ON duration of the second configuration is configured with DL control information directed toward the apparatus.

13. An apparatus for wireless communication, comprising:
a processor;
memory in electronic communication with the processor; and
instructions stored in the memory and operable, when executed by the processor, to cause the apparatus to:
determine a carrier aggregation (CA) configuration comprising a first component carrier with a first subcarrier space (SCS) and a second component carrier with a second SCS different than the first SCS;
perform discontinuous reception (DRX) on the first component carrier based on a first DRX timer duration, the first DRX timer duration being based at least in part on the first SCS; and
perform discontinuous reception (DRX) on the second component carrier based on a second DRX timer duration, the second DRX timer duration being based at least in part on the second SCS, the first DRX timer duration being different than the second DRX timer duration.

14. The apparatus of claim 13, wherein the instructions are executable to:
receive a DRX initiation message; and
wherein the performing DRX on the second component carrier comprises initiate a DRX ON duration according to a second configuration corresponding to the second SCS based at least in part on the DRX initiation message.

15. The apparatus of claim 14, wherein the instructions are executable to:
receive a DRX command message for the second component carrier on the first component carrier; and
transition to a DRX OFF state on the second component carrier based at least in part on the DRX command message.

16. The apparatus of claim 13, wherein the performing DRX on the second component carrier comprises deactivate at least one radio component for communication on the second component carrier for a first period of time according to a second configuration corresponding to the second SCS;
wherein the instructions further:
activate the at least one radio component for an ON duration after the first period of time has elapsed; and
receive a control channel message on the second component carrier during the ON duration, wherein the control channel message indicates a burst length during the ON duration.

17. The apparatus of claim 13, wherein a second configuration corresponding to the second SCS comprises a DL SCS associated with each ON duration of the second configuration.

18. The apparatus of claim 17, wherein the DL SCS associated with each ON duration of the second configuration is configured with DL control information directed toward the apparatus.

19. A non-transitory computer-readable medium storing code for wireless communication, the code comprising instructions executable to:
determining a carrier aggregation (CA) configuration comprising a first component carrier with a first subcarrier spacing (SCS) and a second component carrier with a second TTI length different than the first SCS;
performing discontinuous reception (DRX) on the first component carrier based on a first DRX timer duration, the first DRX timer duration being based at least in part on the first SCS; and
performing discontinuous reception (DRX) on the second component carrier based on a second DRX timer duration, the second DRX timer duration being based at least in part on the second SCS, the first DRX timer duration being different than the second DRX timer duration.

20. The non-transitory computer-readable medium of claim 13 wherein the instructions are executable to:
receive a DRX initiation message; and
wherein the performing DRX on the second component carrier comprises initiating a DRX ON duration according to a second configuration corresponding to the second SCS based at least in part on the DRX initiation message.

21. The non-transitory computer-readable medium of claim 20, wherein the instructions are executable to:
receive a DRX command message for the second component carrier on the first component carrier; and
transition to a DRX OFF state on the second component carrier based at least in part on the DRX command message.

22. The non-transitory computer-readable medium of claim 19, wherein the performing DRX on the second component carrier comprises deactivating at least one radio component for communication on the second component carrier for a first period of time according to a second configuration corresponding to the second SCS;
and the instructions further:
activate the at least one radio component for an ON duration after the first period of time has elapsed; and
receive a control channel message on the second component carrier during the ON duration, wherein the control channel message indicates a burst length during the ON duration.

23. The non-transitory computer-readable medium of claim 19, wherein the DL SCS associated with each ON duration of a second configuration corresponding to the second SCS is configured with DL control information directed toward a user equipment.

24. The non-transitory computer-readable medium of claim 23, wherein a DL burst configuration of the second component carrier comprises a final DL SCS for each DL burst that occurs during an ON duration of the second configuration.

* * * * *